(12) United States Patent
Stickle

(10) Patent No.: US 10,682,015 B1
(45) Date of Patent: Jun. 16, 2020

(54) MOLDING APPARATUS FOR FRYING TACO SHELLS

(71) Applicant: Double JJ Corporation La Hacienda Mexican Food, Dallas, TX (US)

(72) Inventor: John Stickle, Dallas, TX (US)

(73) Assignee: DOUBLE JJ CORPORATION LA HACIENDA MEXICAN FOOD, Dallas, TX (US)

(*) Notice: Subject to any disclaimer, the term of this patent is extended or adjusted under 35 U.S.C. 154(b) by 213 days.

(21) Appl. No.: 15/847,768

(22) Filed: Dec. 19, 2017

Related U.S. Application Data

(60) Provisional application No. 62/436,868, filed on Dec. 20, 2016.

(51) Int. Cl.
A47J 37/12 (2006.01)

(52) U.S. Cl.
CPC .................. A47J 37/1295 (2013.01)

(58) Field of Classification Search
CPC .... A47J 37/12; A47J 37/1295; A47J 37/1214; A21B 5/08; A21C 9/00; B65G 23/30
See application file for complete search history.

(56) References Cited

U.S. PATENT DOCUMENTS

| | | |
|---|---|---|
| 1,470,521 A | 10/1923 | Combest |
| 1,596,652 A | 8/1926 | Giovanetti |
| 1,919,185 A | 7/1933 | Chapman |
| 2,232,633 A | 2/1941 | Richardson |
| 2,534,054 A | 12/1950 | Parkes |
| 2,570,374 A | 10/1951 | Pompa |
| 2,603,143 A | 7/1952 | Saenz |
| 2,907,268 A | 10/1959 | Doolin |
| 2,967,474 A | 1/1961 | Ford |
| 3,132,949 A | 5/1964 | Crowe |
| 3,162,297 A | 12/1964 | Leach |
| 3,292,769 A | 12/1966 | Zuppiger |
| 3,323,633 A | 6/1967 | Engel et al. |
| 3,570,393 A | 3/1971 | Schy |
| 3,602,130 A | 8/1971 | Perez |
| 3,605,605 A | 9/1971 | Sanchez |
| 3,635,638 A | 1/1972 | Bryan |
| 3,653,337 A | 4/1972 | Hanson |
| 3,667,372 A | 6/1972 | Hilvitz et al. |
| 3,680,474 A | 8/1972 | Brown |
| 3,722,400 A | 3/1973 | Jimenez |
| 3,763,764 A | 10/1973 | Schy |
| 3,766,846 A | 10/1973 | Jimenez |
| 3,785,273 A | 1/1974 | Stickle |
| 3,861,289 A | 1/1975 | Baker |
| 3,880,065 A | 4/1975 | Stickle |
| 3,928,638 A | 12/1975 | Stickle |
| 3,946,655 A | 3/1976 | Schy |
| 3,948,160 A | 4/1976 | Stickle |
| 4,091,720 A | 5/1978 | Wheeler |

(Continued)

Primary Examiner — David P Bryant
Assistant Examiner — Lee A Holly

(57) ABSTRACT

An improved taco shell mold apparatus includes at least two portions or assemblies that may be selectively moved between an open configuration and a closed configuration. The two portions or assemblies include rigid surfaces that, when in the closed configuration, are spaced apart by a gap of predefined dimensions defining the boundaries of a cavity that contains and confines the tortilla during frying. This internal cavity between the two portions or assemblies of the taco mold apparatus has a predetermined width.

17 Claims, 18 Drawing Sheets

(56) References Cited

U.S. PATENT DOCUMENTS

| | | |
|---|---|---|
| 4,154,153 A | 5/1979 | Stickle |
| 4,160,043 A | 7/1979 | Stickle et al. |
| 4,173,926 A | 11/1979 | Brignall |
| 4,380,191 A | 4/1983 | Gallegos et al. |
| 4,530,275 A | 7/1985 | Stickle et al. |
| 4,760,775 A | 8/1988 | Hoskins |
| D335,758 S | 5/1993 | Stickle |
| 5,743,174 A | 4/1998 | Stickle |
| 6,073,544 A | 6/2000 | Stickle |

MOLDING APPARATUS FOR FRYING TACO SHELLS

CROSS-REFERENCE TO RELATED APPLICATIONS

This application claims the benefit of U.S. Provisional Application No. 62/436,868, filed Dec. 20, 2016, and entitled MOLDING APPARATUS FOR FRYING TACO SHELLS, the disclosure of which is incorporated by reference herein in its entirety.

TECHNICAL FIELD

The following disclosure relates to cooking apparatus of a hot-oil type with a conveyor for moving a plurality of food molding and/or supporting apparatus through a hot-oil frying vat, and in particular to molding apparatus for use on such cooking apparatus.

BACKGROUND

A popular Mexican food is the taco. The taco is made by folding and frying a tortilla in hot oil to form a relatively rigid taco shell. The taco shell is then filled with meat, cheese, vegetables, sauces, etc. according to taste and the availability of ingredients.

Apparatus and methods for manufacturing and/or frying taco shells are disclosed in the following U.S. patents, among others: U.S. Pat. No. 3,785,273 to D. T. Stickle; U.S. Pat. No. 3,928,638 to D. T. Stickle, U.S. Pat. No. 4,154,153 to D. T. Stickle, U.S. Pat. No. 4,160,043 to D. T. Stickle, deceased, et al., U.S. Pat. No. 4,530,275 to J. S. Stickle et al., U.S. Pat. No. 5,743,174 to J. S. Stickle; U.S. Pat. No. 6,073,544 to J. S. Stickle, and U.S. Pat. No. D335,758 to J. S. Stickle. U.S. Pat. Nos. 3,785,273, 3,928,638, 4,154,153, 4,160,043, 4,530,275, 5,743,174; 6,073,544 and D335,758 are incorporated by reference herein in their entireties.

Conventional apparatus and methods for manufacturing and/or frying taco shells (so-called "in-line" production) are optimized for production of taco shells made from corn tortillas. However, increasing popularity of flour tortillas is fueling a demand for taco shells made from flour tortillas. The production of taco shells from flour tortillas in conventional in-line apparatus may be problematic due to the different characteristics of flour tortillas relative to corn tortillas. For example, a special corn flour known as "taco shell #6" corn flour is used to produce taco shells made in-line from corn. Because small, medium and large particles of corn flour are blended to make the taco shell #6 corn flour, the hot corn tortilla coming out of the oven and into the taco fryer will not blister. Flour tortillas have much finer particles, making them very difficult to fry without large blisters occurring. Also, flour tortillas contain gluten whereas corn tortillas are gluten-free. A need therefore exists, for new apparatus and methods for in-line manufacturing and/or frying taco shells, including for manufacturing and/or frying taco shells made from flour tortillas.

SUMMARY

In one aspect thereof, an improved taco shell mold system is provided that may be used with any formula of flour tortillas for in-line frying of flour taco shells. In spite of the difficulties in formulating consistent flour tortillas to fry that also taste good, this apparatus and method, which may be referred to as "trap gapping," may be used with all known (i.e., conventional) taco frying equipment, and yields flour taco shells that may be stacked together just like stacking corn taco shells are done now. Thus, with trap gapping equipment, the blistering of flour tortillas used for taco shells is controlled by the equipment and not by the formula of the flour tortilla. This gives the widest range of using any flour tortilla and no worries about blisters causing problems for stacking and packaging.

In another aspect thereof, an improved taco shell mold apparatus includes at least two portions or assemblies that may be selectively moved between an open configuration and a closed configuration. The two portions or assemblies include rigid surfaces that, when in the closed configuration, are spaced apart by a gap of predefined dimensions defining the boundaries of a cavity that contains and confines the tortilla during frying. This internal cavity between the two portions or assemblies of the taco mold apparatus has a predetermined width.

In one embodiment, the predetermined width of the cavity is uniform between all portion of the two portions or assemblies.

In another embodiment, the predetermined width of the cavity may be different in different portions of the cavity.

In still another embodiment, the predetermined width of the internal cavity between the two portions or assemblies of the taco mold apparatus may be wider than the tortilla to allow hot oil to reach both sides of the tortilla for cooking it.

In a further embodiment, when the taco shell mold apparatus is in the closed configuration, the first and second rigid surfaces forming the walls of the internal cavity confine the tortilla during frying in the hot oil to ensure that the finished taco shell has surface contours that remain within the predetermined dimensions of shape and thickness.

In another embodiment, the taco shell mold apparatus is adapted for holding and frying flour tortillas for making flour taco shells.

In yet another embodiment, the taco shell mold apparatus is adapted for holding and frying corn tortillas for making corn taco shells.

In a further embodiment, the predetermined gap between the opposing rigid portions or assemblies of the improved taco shell mold apparatus may be provided by interposing a spacer member of predetermined width between the opposing rigid portions or assemblies.

In another embodiment, the transport system of the taco shell frying machine may insert spacer members of predetermined dimension between the opposing rigid portions or assemblies of the taco shell mold as the apparatus is moved into the closed configuration to maintain a gap of predetermined distance between the opposing portions or assemblies.

In still another aspect, a taco shell molding and cooking apparatus folds tortillas into a predetermined curved configuration and submerses the folded tortillas in hot cooking fat or hot cooking oil while maintaining the predetermined curved configuration. The apparatus comprises an inner mold assembly, an outer mold assembly and at least one spacer member. The inner mold assembly includes a front inner mold section having a top edge, a bottom edge and a flat front surface extending therebetween, the flat front surface defining a front inner plane. The inner mold assembly further includes a rear inner mold section defining a top edge, a bottom edge and a flat rear surface extending therebetween, wherein the flat rear surface defines a rear inner plane and the front and rear inner mold sections are configured nonparallel to one another such that the front and rear inner plane intersect along a line defining a transverse axis. The inner mold assembly further includes a top inner mold section extending in an outwardly convex curved fashion between the top edge of the front inner mold section and the top edge of the rear inner mold section. The outer mold assembly includes a front outer mold plate defining a top edge and a bottom edge and having a flat front surface extending therebetween, the bottom edge of the front outer mold plate being hingedly connected to the bottom edge of the front inner mold section along a transverse pivot axis. The outer mold assembly further includes a top outer mold section comprising a sequence of transversely extending rigid rod members, the sequence beginning with a first rigid rod member and ending with a last rigid rod member. The first rigid rod member is attached to the top edge of the front outer mold plate and has a first rod axis extending parallel to the transverse axis and each successive rigid rod member in the sequence including the last rigid rod member is positioned further from the top edge of the front outer mold plate than the respective previous rigid rod member, has a respective rod axis extending parallel to the transverse axis, and is hingedly connected to the respective previous rigid rod member along a respective transverse pivot axis. The rigid rods of the top outer mold section are individually rigid in the transverse direction but the sequence of rod members is collectively curvable along a curve formed perpendicular to the transverse axis. The outer mold assembly further includes a rear outer mold plate defining a top edge and a bottom edge and having a flat rear surface extending therebetween, the top edge of the rear outer mold plate being connected to the last rod member of the sequence of rod members. The front outer mold plate, top outer section and rear outer mold plate are selectively movable between an open configuration wherein the outer mold assembly does not cover the inner mold assembly and a closed configuration wherein the outer mold assembly covers the outer mold assembly. At least one spacer member has, when viewed in the transverse direction, a predetermined thickness between an inner surface and an outer surface. The spacer member is positionable between the inner mold assembly and the outer mold assembly such that when the outer mold assembly is in the closed configuration the front inner mold section contacts the inner surface of the spacer member and the front outer mold plate contacts the outer surface of the spacer member, producing a transversely extending gap of the predetermined thickness between the front inner mold section and the front outer mold plate. Further, when the outer mold assembly is in the closed configuration, the rear inner mold section contacts the inner surface of the spacer member and the rear outer mold plate contacts the outer surface of the spacer member, producing a transversely extending gap of the predetermined thickness between the rear inner mold section and the rear outer mold plate. Further still, when the outer mold assembly is in the closed configuration, the curved top inner mold section contacts the inner surface of the spacer member and the curvable sequence of rod members of the top outer mold section contacts the outer surface of the spacer member, producing a transversely extending curved gap of the predetermined thickness between the top inner mold section and the top outer mold section. Thus, when the outer mold assembly is in the closed configuration a transversely extending continuous gap of the predetermined thickness is formed along the front, top and rear of the inner mold assembly.

BRIEF DESCRIPTION OF THE DRAWINGS

For a more complete understanding, reference is now made to the following description taken in conjunction with the accompanying Drawings in which:

FIG. 15 illustrates the mold assembly still in the open configuration;

FIG. 16 illustrates the mold assembly in a partially open/partially closed configuration;

FIG. 17 illustrates the mold assembly in a further partially open/partially closed configuration; and FIG. 18 illustrates the mold assembly in a closed configuration.

DETAILED DESCRIPTION

Figure 1:
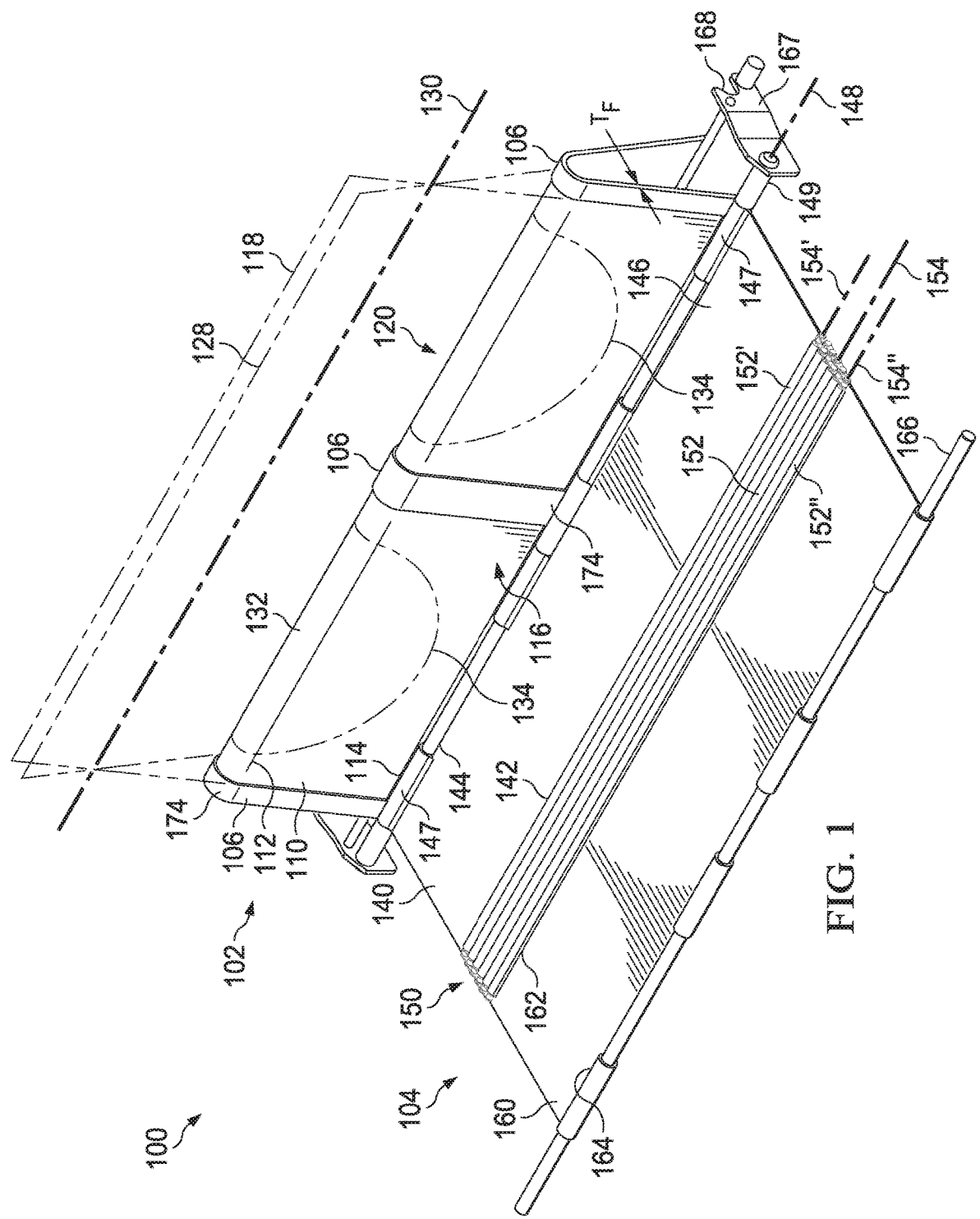
FIG. 1 is a front perspective view of a molding apparatus for frying taco shells in accordance with one aspect.

A molding apparatus for frying taco shells in accordance with one aspect comprises an improved taco shell molding apparatus adapted for use in a taco shell frying machine having a continuous transport system and an oil-bath cooking tank. The taco shell frying machine may be of conventional design or of a new design made especially to interface with the improved molding apparatus described herein. One or more of the improved molding apparatus, also referred to as taco molds, are attached to the continuous transport system of the taco shell frying machine. The taco molds are sequentially opened, loaded with a tortilla, closed with the tortilla inside to mold the tortilla into the desired configuration, submersed in hot oil of the oil-bath cooking tank to cook the tortilla into a taco shell and then opened to release the cooked taco shell. At the end of the afore-described process the taco mold is open so that the process may then be repeated.

The improved taco shell mold apparatus includes at least two portions or assemblies that may be selectively moved between an open configuration and a closed configuration. In some embodiments the two portions or assemblies may be inner and outer portions or assemblies and in other embodiments the two portions or assemblies may be right and left portions or assemblies and in still other embodiments the two portions or assemblies may be upper and lower portions or assemblies. In some embodiments, that two portions or assemblies may be hinged together to move between the open and closed configurations. In other embodiments, the two portions or assemblies may be attached to different portions of the taco shell frying machine such that they can be moved farther apart for the open configuration and closer together for the closed configuration. In still other embodiments, the two portions or assemblies of the taco shell apparatus may be complimentary sides of a two identical subassemblies; for example where the front side of a first taco mold subassembly moves into proximity with the back side of a second, identical, taco mold subassembly and interfits with the second taco mold assembly to configure the apparatus in the closed configuration and to hold the tortilla therebetween, and the first taco mold subassembly subsequently moves out of proximity with the second taco mold subassembly to configure the apparatus in the open configuration to release the cooked taco shell.

In all of the variations of the improved taco mold apparatus, the two portions or assemblies include rigid surfaces that, when in the closed configuration, are spaced apart by a gap of predefined dimensions defining the boundaries of a cavity that contains and confines the tortilla during frying. This internal cavity between the two portions or assemblies of the taco mold apparatus has a predetermined width. In some embodiments, the predetermined width of the cavity is uniform between all portion of the two portions or assemblies. In other embodiments, the predetermined width of the cavity may be different in different portions of the cavity. For example, in some embodiments the gap forming the cavity may have a different value in the straight portions (e.g., front and rear) of the taco shell mold as compared to the curved portion (i.e., top) of the taco shell mold. The predetermined width of the internal cavity between the two portions or assemblies of the taco mold apparatus may be wider than the tortilla to allow hot oil to reach both sides of the tortilla for cooking it.

When the taco shell mold apparatus is in the closed configuration, the first and second rigid surfaces forming the walls of the internal cavity confine the tortilla during frying in the hot oil to ensure that the finished taco shell has surface contours that remain within the predetermined dimensions of shape and thickness. For example, when tortillas are cooked in hot oil, moisture within the tortilla may change to steam, causing bubbling or puffing on the surface of the tortilla that can distort the shape and/or dimension (especially wall thickness) of the tortilla. Bubbling and/or puffing of the tortilla walls can be especially pronounced in tortillas made from gluten-containing wheat flour (so-called "flour tortillas") as compared to tortillas made from corn masa or corn flour (so-called "corn tortillas"). These distortions of shape and/or dimensions of the tortilla may become permanent as the tortilla cooks into a rigid taco shell. If uncontrolled, the bubbling and/or puffing of the tortilla walls during frying may cause the cooked taco shell to have unacceptable variations in shape and/or wall thickness. The bubbling and/or puffing of the tortilla walls during frying may also cause the walls to swell through large perforations such as those occurring in conventional mesh taco molds resulting in portions of the taco shell becoming trapped in the mold to prevent release or cause breakage. However, the rigid walls and predetermined gap (between portions or assemblies) of the improved taco shell mold apparatus control the amount of distortion that can occur due to bubbling or puffing of the tortilla walls during cooking. Thus, the shape and dimension of the finished taco shell may remain within the predetermined guidelines.

In some embodiments, the predetermined gap between the opposing rigid portions or assemblies of the improved taco shell mold apparatus may be provided by interposing a spacer member of predetermined width between the opposing rigid portions or assemblies. In some embodiments, the spacer members may be attached to one of the rigid portion or assemblies, for example to the inner portion or assembly or the lower portion or assembly, in order to contact the opposing portion or assembly as the apparatus is moved into the closed configuration to maintain a gap of predetermined distance between the opposing portions or assemblies. In other embodiments, the transport system of the taco shell frying machine may insert spacer members of predetermined dimension between the opposing rigid portions or assemblies of the taco shell mold as the apparatus is moved into the closed configuration to maintain a gap of predetermined distance between the opposing portions or assemblies.

Figure 2:
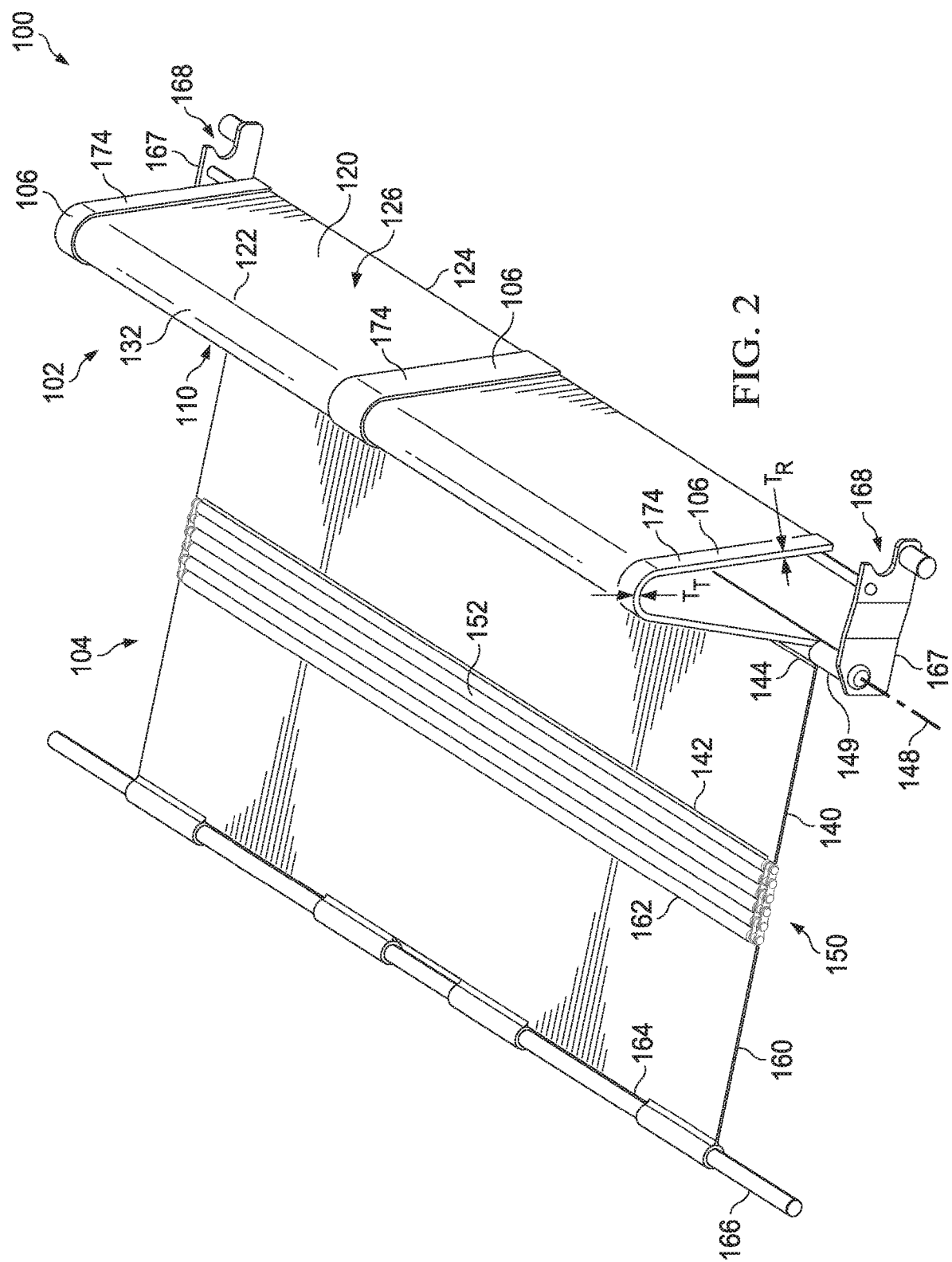
FIG. 2 is a rear perspective view of the molding apparatus of FIG. 1.
Figure 3:
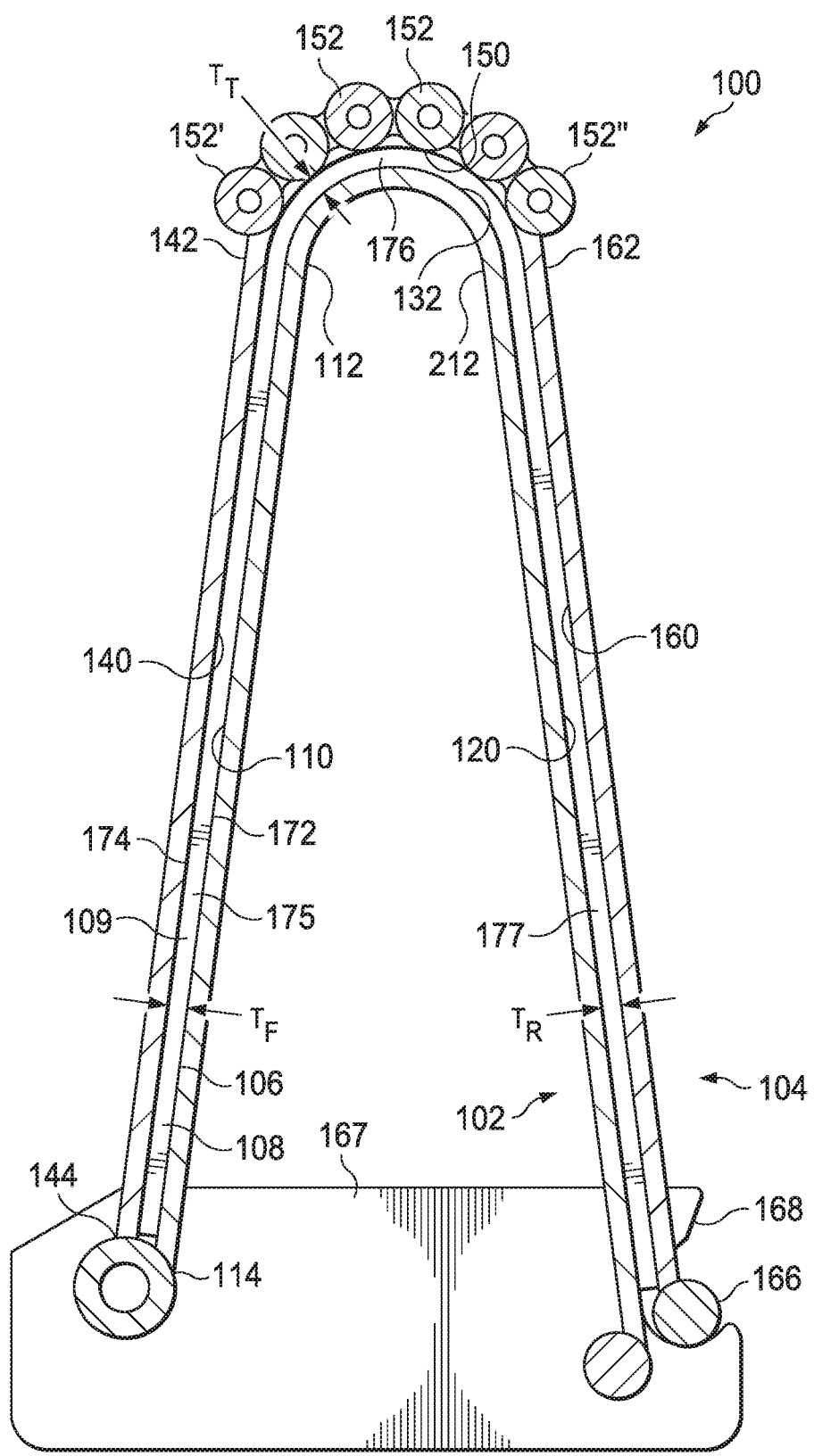
FIG. 3 is a cross-sectional side view of a molding apparatus of FIG. 1.

Referring now to FIGS. 1-3, there is illustrated a taco shell molding and cooking apparatus in accordance with another aspect. Taco molding apparatus 100 (also known as a "taco mold") is configured for mounting to the conveyor system of a taco shell cooking machine. The taco shell cooking machine may be of substantially conventional design except for the taco molding apparatus 100, which is used in place of a conventional taco mold. Typically, a taco shell cooking machine will carry a plurality of such taco molds linked together or closely spaced on a continuous conveyor system. Each taco shell mold is sequentially loaded with a tortilla, closed to fold the tortilla into a desired configuration, carried through a hot-oil cooking bath to fry the tortilla, and then opened to extract the cooked taco shell. The cooking process is typically continuous with the taco shell molds circulating endlessly through the taco shell cooking machine.

The taco mold 100 includes an inner mold assembly 102 and an outer mold assembly 104 that may be selectively moved between an open configuration (e.g., shown in FIGS. 1 and 2) and a closed configuration (e.g., shown in FIG. 3). The taco mold 100 further comprises at least one spacer member 106 positioned between the inner mold assembly 102 and the outer mold assembly 104 to maintain a transversely extending gap 108 (best seen in FIG. 3) of predetermined dimensions (e.g., predetermined thickness or predetermined thicknesses) between the inner mold assembly and the other mold assembly. This gap 108 forms a cavity 109 (FIG. 3) within which the tortilla is confined as it is fried to form the taco shell.

In the illustrated embodiment, the inner mold assembly 102 of the taco mold 100 includes a front inner mold section 110 having a top edge 112, a bottom edge 114 and a flat front surface 116 extending therebetween, the flat front surface defining a front inner plane 118. As best seen in FIG. 2, the inner mold assembly 102 further includes a rear inner mold section 120 defining a top edge 122, a bottom edge 124 and a flat rear surface 126 extending therebetween, the flat rear surface defining a rear inner plane 128. The front and rear inner mold sections 110 and 120 are configured nonparallel to one another such that the front inner plane 118 and rear inner plane 128 intersect along a line defining a transverse axis 130. The inner mold assembly 102 further includes a top inner mold section 132 extending in an outwardly convex curved fashion between the top edge 112 of the front inner mold section 110 and the top edge 122 of the rear inner mold section 120. During use, tortillas 134 (shown in phantom) are placed over the curved top inner mold section 132 and hang down (or are pressed down) against the flat front and rear surfaces 116 and 126 when the taco mold 100 is configured in the open configuration. When the taco mold 100 is subsequently re-configured into the closed configuration (FIG. 3), the tortillas 134 are "trapped in the gap," i.e., confined in the cavity 109 formed by the gap 108 between the inner mold assembly 102 and outer mold assembly 104.

Referring again particularly to FIG. 1, in the illustrated embodiment, the outer mold assembly 104 includes a front outer mold plate 140 having a top edge 142 and a bottom edge 144 and defining a flat front surface 146 extending therebetween. The bottom edge 144 of the front outer mold plate 140 is hingedly connected to the bottom edge 114 of the front inner mold section 110 along a transverse pivot axis 148 (i.e., the front outer mold plate 140 pivots about the axis 148 that is parallel to the transverse axis 130). In the embodiment shown the hinged connection includes hinge members 147 attached to the bottom edge 144 of the front outer mold plate 140 and pivoting on a front carrier bar 149 extending along the pivot axis 148 and attached to the front inner mold section 110. The front carrier bar 149 may be used to mount the taco mold apparatus 100 to the transport conveyor (not shown) of the taco shell frying machine.

The outer mold assembly 104 of the illustrated embodiment further includes a top outer mold section 150 comprising a sequence of transversely extending rigid rod members 152, the sequence beginning with a first rigid rod member 152' and ending with a last rigid rod member 152". The first rigid rod member 152' is attached to the top edge 142 of the front outer mold plate 140 and has a first rod axis 154' extending parallel to the transverse axis 130. Each successive rigid rod member 152 in the sequence including the last rigid rod member 152" is positioned further from the top edge 142 of the front outer mold plate 140 than the respective previous rigid rod member, has a respective rod axis 154 or 154" extending parallel to the transverse axis 130, and is hingedly connected to the respective previous rigid rod member 152' or 152 along a respective transverse pivot axis 154', 154 or 154" (i.e., the respective rod axes and pivot axes are typically collinear).

Figure 4:
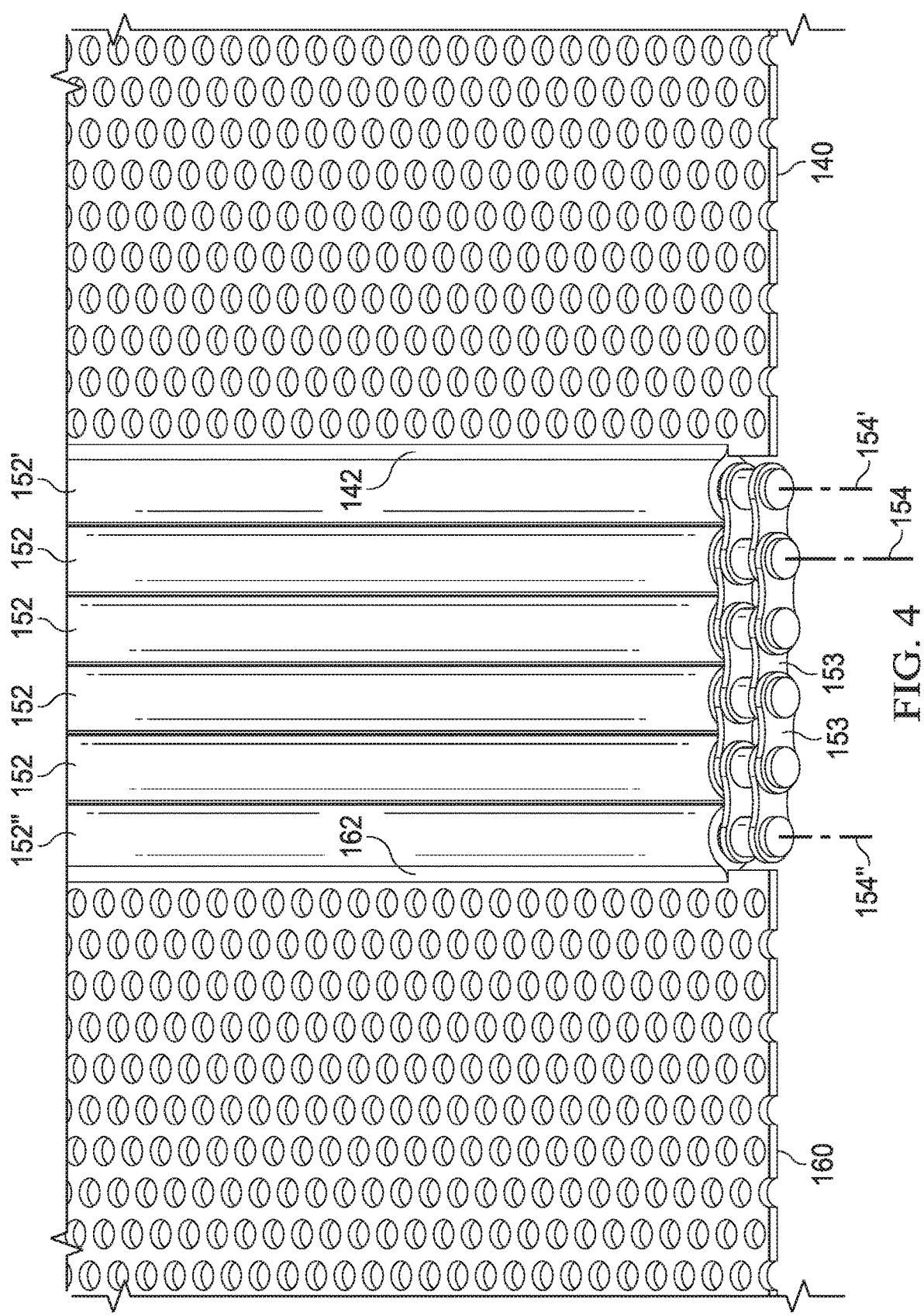
FIG. 4 is an enlarged view of a portion of the outer mold assembly including portions of the rod members of the top outer mold section and the top and bottom outer mold plates.

Referring now particularly to FIG. 3, and additionally to FIG. 4, in the illustrated embodiment each rigid rod 152 of the top outer mold section 150 is hingedly connected to the adjacent rigid rods in the sequence (i.e., the previous and/or next rod of the sequence). As best seen in FIG. 4, in the illustrated embodiment, the rigid rods 152 are hingedly connected to one another using sections of roller chain 153 affixed to the ends of the rigid rods. Because each rigid rod member 152 is hingedly connected to the adjacent rigid rod members, the sequence of rigid rod members is collectively curvable in the direction perpendicular to the transverse axis 130 while, at the same time, the rods remain rigid in the transverse direction. Stated another way, the top outer mold section 150 is flexible in the machine direction (i.e., the direction of mold conveyance through the frying apparatus) while also being rigid in the cross-machine direction (i.e., the direction perpendicular to mold conveyance through the frying apparatus). Thus, when the taco mold apparatus 100 is in an open configuration as seen in FIGS. 1, 2 and 4, the top outer mold section 150 can have a straight line configuration (viewed in the transverse direction) wherein the inner surfaces of the rigid rods (i.e., the upward facing sides in FIGS. 1, 2 and 4) define a flat plane extending across the mold in the transverse direction 130. But when the taco mold apparatus 100 is in a closed configuration as seen in FIG. 3, the top outer mold section 150 can have a curved configuration (viewed in the transverse direction) wherein the inner surface of the rigid rods defines a downwardly concave surface extending across the mold in the transverse direction 130.

Referring again particularly to FIG. 1, the outer mold assembly 104 further comprises a rear outer mold plate 160 having a top edge 162 and a bottom edge 164 and defining a flat rear surface 166 extending therebetween, the top edge 162 of the rear outer mold plate being connected to the last rod member 152" of the sequence of rod members making up the top outer mold section 150. A rear carrier bar 166 may be connected to the bottom edge 164 of the rear outer mold plate 160 for use mounting the taco mold apparatus 100 to the transport conveyor (not shown) of the taco shell frying machine.

The front outer mold plate 140, top outer section 150 and rear outer mold plate 160 of the outer mold assembly 104 are selectively movable between an open configuration (e.g., shown in FIGS. 1, 2 and 4) and a closed configuration (e.g., shown in FIG. 3). In the open configuration, the outer mold assembly 104 does not cover the inner mold assembly 102, while in the closed configuration the outer mold assembly covers the inner mold assembly. One or more support members 167 may be provided on the taco mold apparatus 100 to secure the outer mold assembly 104 in the closed configuration to cover the inner mold assembly 102. In the illustrated embodiment, support members 167 are provided on the inner mold assembly 102 near the transverse ends of front carrier bar 149 and configured with slots 168 to receive and secure the rear carrier bar 166 when the outer mold assembly 104 is in the closed configuration. The support members 167, front carrier bar 149 and/or rear carrier bar 166 may also serve to attach or interface the mold assembly apparatus 100 to the conveyor of the taco shell frying machine or to actuators on the taco shell frying machine, e.g., to open and close the taco mold at appropriate times as it moves through the taco shell frying machine.

The spacer members 106 (three of which are present in the illustrated embodiment) have a predetermined thickness T (i.e., when viewed in the transverse direction 130) between an inner surface 172 and an outer surface 174 and are positionable between the inner mold assembly 102 and the outer mold assembly 104. In the illustrated embodiment, the spacer members 106 are attached to the outer surfaces of the inner mold assembly 102, but in other embodiments the spacer members may be attached to the inner surfaces of the outer mold assembly 104 or completely separate and positioned between the inner and outer mold assemblies by the taco shell frying machine at the appropriate stage of the molding process.

In some embodiments, the predetermined thickness T of the spacer members 106 between the inner and outer surfaces 172 and 174 may uniform over the entire surface of the spacer member and thus defined with a single parameter T. In other embodiments, however, the predetermined thicknesses T of the spacer members 106 may defined in different areas. For example, in the illustrated embodiment, the front portion of the space member 106 (i.e., adjacent to the front inner mold section 110) has a predetermined thickness denoted $T_F$ (see FIGS. 1 and 3), the top portion of the space member (i.e., adjacent to the top inner mold section 132) has a predetermined thickness denoted $T_T$ (see FIGS. 2 and 3) and the rear portion of the space member (i.e., adjacent to the rear inner mold section 120) has a predetermined thickness denoted $T_R$, (see FIGS. 2 and 3). In embodiments having a spacer member 106 of uniform thickness, then $T_F=T_T=T_R$. But in other embodiments, the thicknesses $T_F$, $T_T$ and $T_R$ may have different values from one another.

The thickness of the spacers can be selected based on the thickness of the tortilla to be fried and/or the ingredients of the tortilla to be fried. In some embodiments, the values of the front thickness $T_F$, top thickness $T_T$ and rear thickness $T_R$ are all within the range from 1/16 inch to 3/8 inch, and in other embodiments the spacer thicknesses are selected to produce gaps 175, 176 and 177 within the range from 1/16 inch to 3/8 inch. In further embodiments, the values of the front thickness $T_F$, top thickness $T_T$ and rear thickness $T_R$ are all within the range from 1/16 inch to 3/16 inch and in other embodiments the spacer thicknesses are selected to produce gaps 175, 176 and 177 within the range from 1/16 inch to 3/16 inch. In still further embodiments, the values of the front thickness $T_F$, top thickness $T_T$ and rear thickness $T_R$ are all within the range from 1/8 inch to 1/4 inch and in other embodiments the spacer thicknesses are selected to produce gaps 175, 176 and 177 within the range from 1/8 inch to 1/4 inch. In embodiments within these ranges, the thicknesses of the front, top and rear spacers may have the same values or different values from one another within the specified ranges and/or the gaps 175, 176, 177 may have the same values or different values from one another within the specified ranges.

As best seen in FIG. 3, when the outer mold assembly 104 is in the closed configuration, the front inner mold section 110 contacts the inner surface 172 of the spacer member 106 and the front outer mold plate contacts the outer surface 174 of the spacer member, producing a transversely extending gap 175 of the predetermined thickness T (in this case, $T_F$) between the front inner mold section and the front outer mold plate. Further, the rear inner mold section 120 contacts the inner surface 172 of the spacer member 160 and the rear outer mold plate 160 contacts the outer surface 174 of the spacer member, producing a transversely extending gap 177 of the predetermined thickness T (in this case, $T_R$) between the rear inner mold section and the rear outer mold plate. Further, the curved top inner mold section 132 contacts the inner surface 172 of the spacer member 160 and the curvable sequence of rod members 152 of the top outer mold section 150 contacts the outer surface 174 of the spacer member, producing a transversely extending curved gap 176 of the predetermined thickness T (in this case, $T_T$) between the top inner mold section and the top outer mold section. Thus, when the outer mold assembly 104 is in the closed configuration, a transversely extending continuous cavity 109 is formed by the gap 108 having the predetermined thickness T, more particularly, front gap portion 175 having thickness $T_F$, top gap portion 176 having thickness $T_T$ and rear gap portion 177 having thickness $T_R$ along the respective front, top and rear of the inner mold assembly. The tortillas 134 (FIG. 1) are confined in the cavity 109 between the inner and outer mold assemblies 102, 104 during frying (i.e., "trapped in the gap"). It will be appreciated that in embodiments where the thickness T of the spacer member 106 is uniform, the width of the transversely extending gap 108 with respective gap portions 175, 176 and 177 will also be uniform, thus the transversely extending cavity 109 formed by the gap for confining the tortillas 134 during frying will have uniform predetermined dimensions. In embodiments where the thickness T of the spacer member 160 varies between areas $T_F$ $T_T$ and $T_R$, respectively, then the transversely extending gap 108 will have different predetermined widths in the respective gap portions 175, 176 and 177, and thus the transversely extending cavity 109 formed by the gap for confining the tortillas 134 during frying will have correspondingly different predetermined dimensions in respective portions. Taco shells produced in the molding apparatus 100 will thus always have dimensions falling within the bounds of the predetermined dimensions of the cavity 109.

The taco shell molding apparatus 100 may be formed of metals or metal alloys including food-grade stainless steels and food-grade electroplated steels. In some embodiments, some or all of the surfaces of the inner mold assembly 102 and outer mold assembly 104 may be formed of solid (i.e., non-perforated) metal or other materials (see, e.g., FIGS. 1, 2, 6, 7, 12 and 14). In some embodiments, some or all of the surfaces of the inner mold assembly 102 and outer mold assembly 104 may be formed of perforated metal or other materials (see, e.g., FIGS. 5, 8, 9 and 13). Regardless of whether formed from perforated or non-perforated metal or other materials, the various components 110, 120, 132, 140, 150 and/or 160 of the taco mold apparatus 100 are rigid enough to prevent flexing or distortion by bubbling and/or blistering of the tortillas 134 as they fry; in other words, rigid enough to maintain the tortilla within the predetermined dimensions of the cavity 109. When the components 110, 120, 132, 140, 150 and/or 160 are formed of perforated materials, the perforations are dimensioned to be small enough to prevent the entrance of any bubbles or blisters formed by the skin of the frying tortilla. Thus, the taco shell will not become stuck to the molding apparatus 100 due to protrusion of skin bubbles or skin blisters through perforations. In some embodiments, the perforations on the various components 110, 120, 132, 140, 150 and/or 160 of the taco mold apparatus 100 are holes having a maximum dimension of 2.0 mm or less. In some embodiments, the perforations on the various components 110, 120, 132, 140, 150 and/or 160 of the taco mold apparatus 100 are holes having a maximum dimension of 1.5 mm or less. In some embodiments, the perforations on the various components 110, 120, 132, 140, 150 and/or 160 of the taco mold apparatus 100 are holes having a maximum dimension of 1.0 mm or less.

Figure 5:
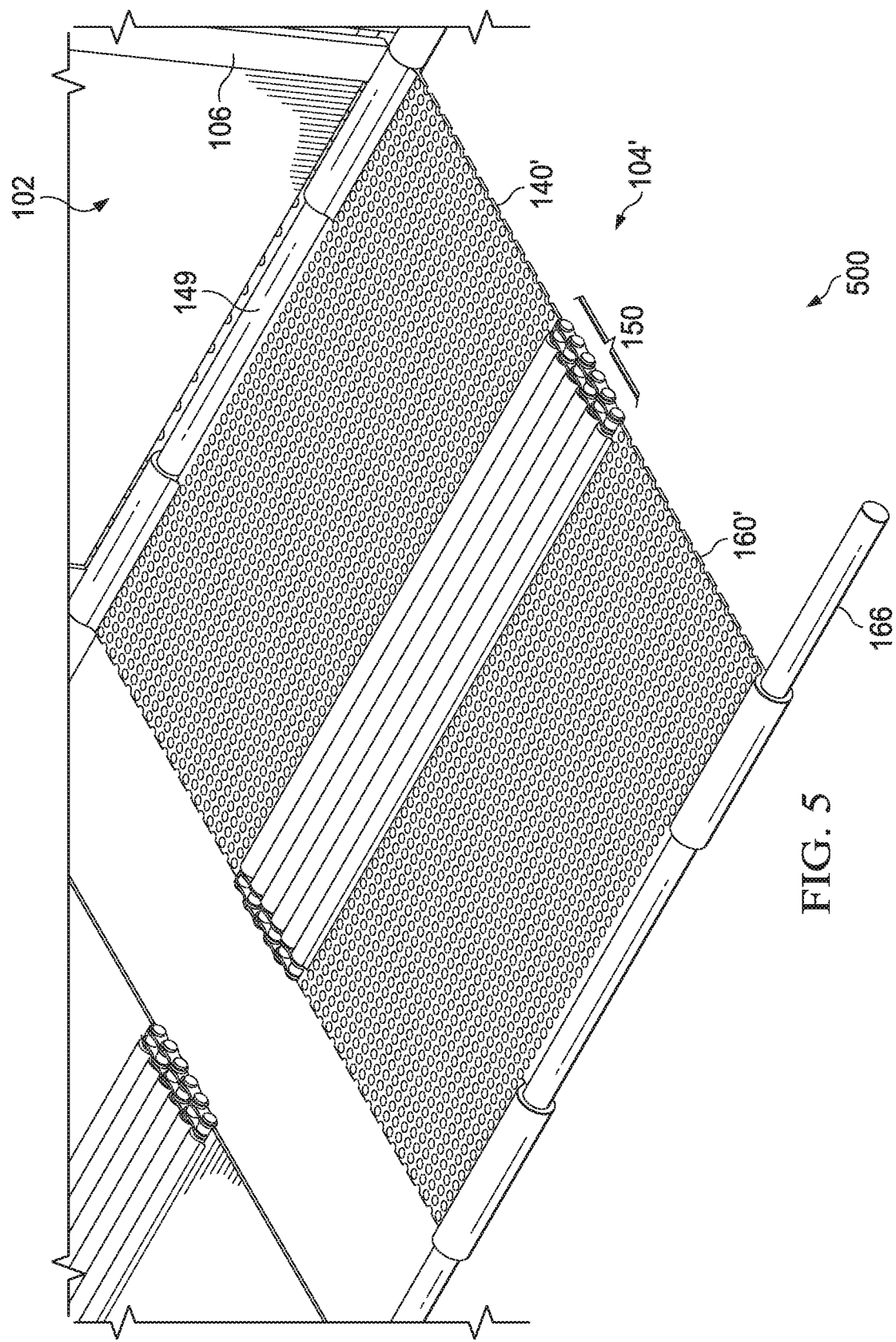
FIG. 5 is a perspective view of a molding apparatus in accordance with another embodiment having an inner mold assembly with solid (i.e., non-perforated) rigid front, rear and top inner mold sections and an outer mold assembly with perforated rigid front and rear outer mold plates, the subject molding apparatus being a first of two improved taco molds transversely arranged on a single set of carrier bars.

FIG. 5 is a perspective view of a molding apparatus 500 in accordance with another embodiment having an inner mold assembly 102 with solid (i.e., non-perforated) rigid front, rear and top inner mold sections and an outer mold assembly 104' with perforated rigid front and rear outer mold plates 140' and 160', the subject molding apparatus being a first of two improved taco molds transversely arranged on a single set of carrier bars 149, 166.

Figure 6:
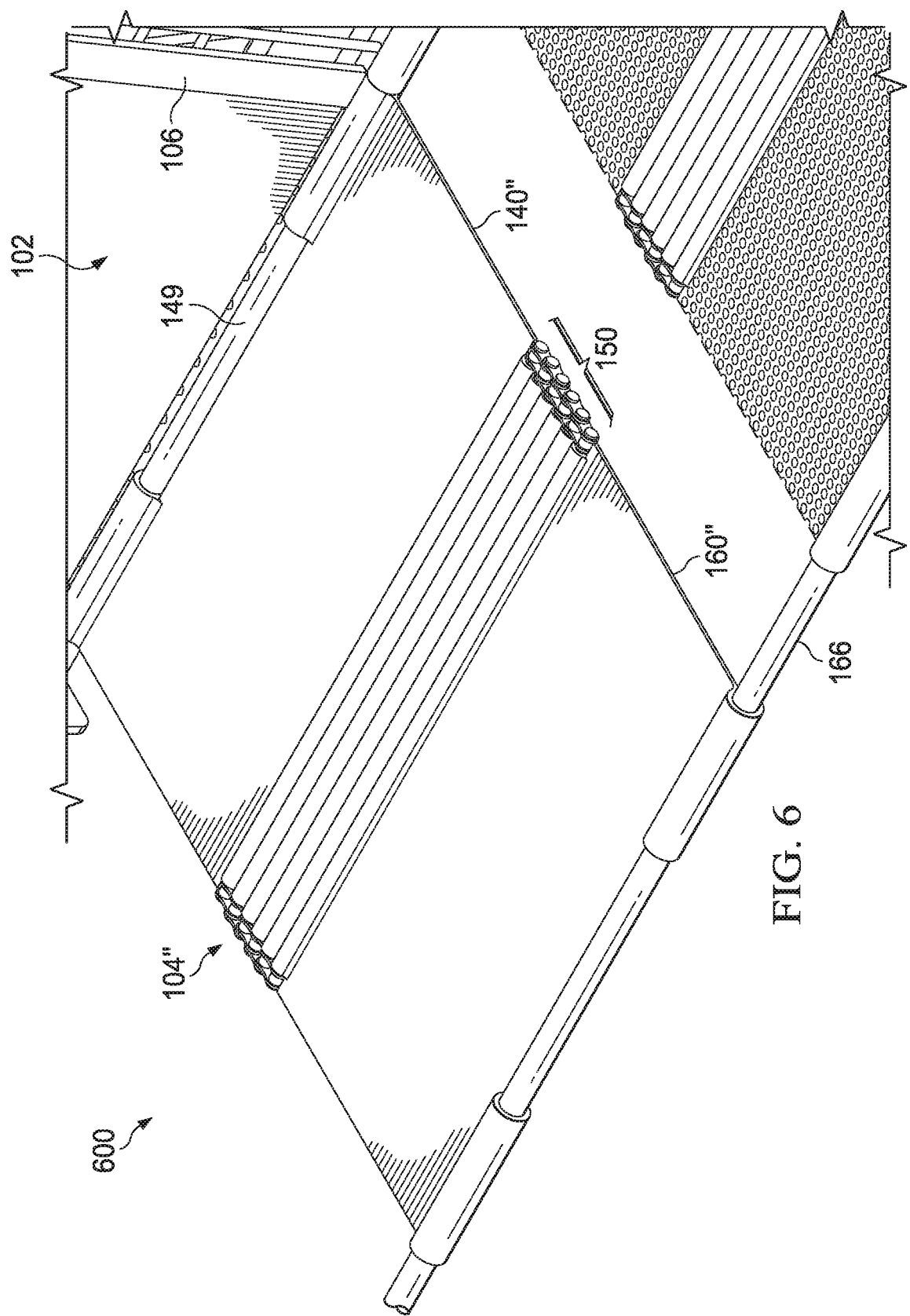
FIG. 6 is a perspective view of a molding apparatus in accordance with yet another embodiment having an inner mold assembly with solid (i.e., non-perforated) rigid front, rear and top inner mold sections and an outer mold assembly with solid (i.e., non-perforated) rigid front and rear outer mold plates, the subject molding apparatus being a second of two improved taco molds transversely arranged on the single set of carrier bars.

FIG. 6 is a perspective view of an alternative molding apparatus 600 in accordance with yet another embodiment having an inner mold assembly 102 with solid (i.e., non-perforated) rigid front, rear and top inner mold sections and an outer mold assembly 104" with solid (i.e., non-perforated) rigid front and rear outer mold plates 140" and 160", the subject molding apparatus being a second of two improved taco molds transversely arranged on the single set of carrier bars 149, 166.

Figure 7:
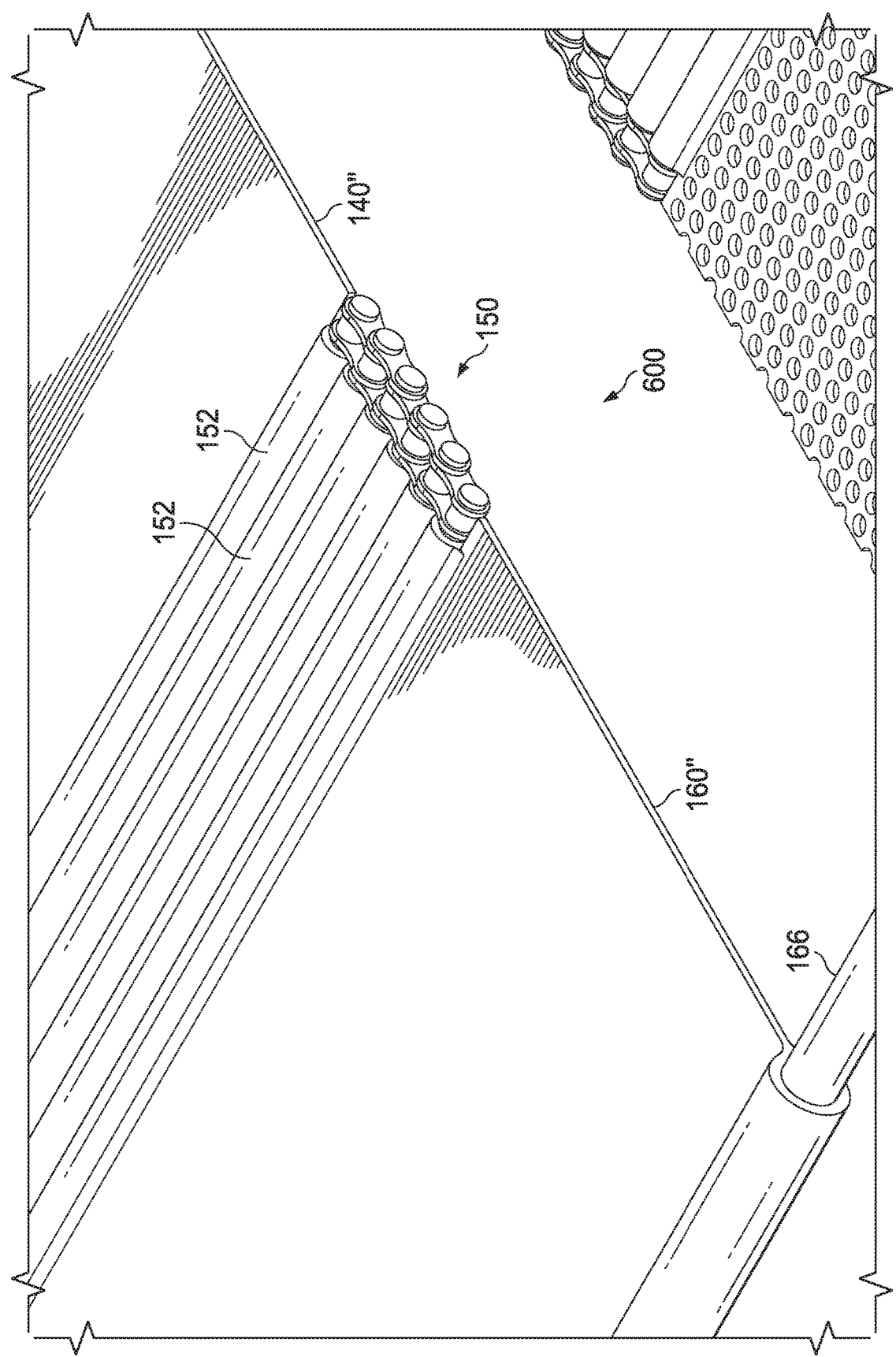
FIG. 7 is an enlarged view of the lateral edge of the molding apparatus of FIG. 6 showing details of the structure of the solid rigid front and rear outer mold plates connected to the top outer mold section comprising a sequence of rigid bar members flexibly connected to one another.

FIG. 7 is an enlarged view of the lateral edge of the molding apparatus 600 of FIG. 6 showing details of the structure of the solid rigid front and rear outer mold plates 140" and 160" connected to the top outer mold section 150 comprising a sequence of rigid bar members 152 flexibly connected to one another.

Figure 8:
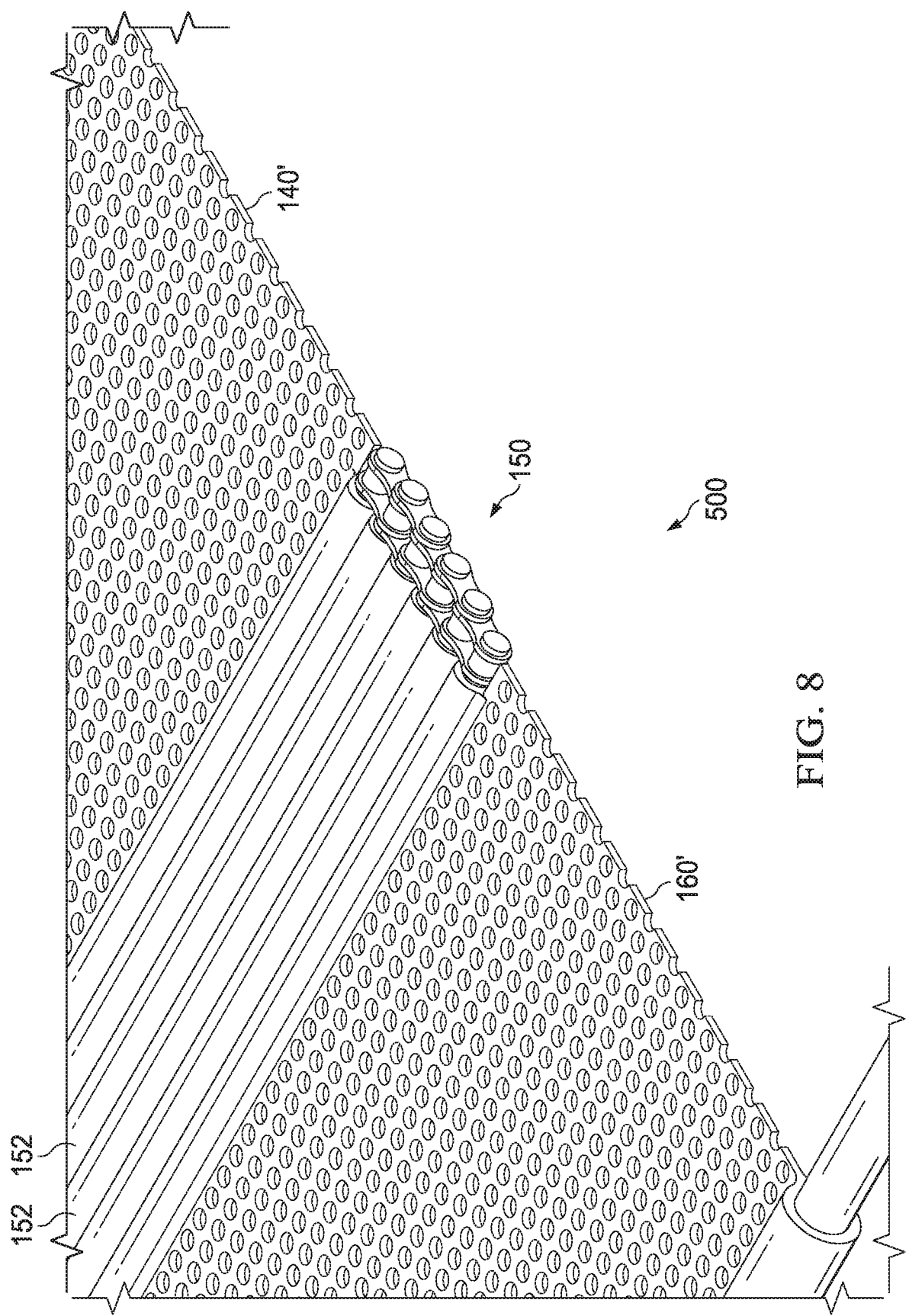
FIG. 8 is an enlarged view of the lateral edge of the molding apparatus of FIG. 5 showing details of the structure of the perforated rigid front and rear outer mold plates connected to the top outer mold section comprising a sequence of rigid bar members flexibly connected to one another.

FIG. 8 is an enlarged view of the lateral edge of the molding apparatus 500 of FIG. 5 showing details of the structure of the perforated rigid front and rear outer mold plates 140' and 160' connected to the top outer mold section 150 comprising a sequence of rigid bar members 152 flexibly connected to one another.

Figure 9:
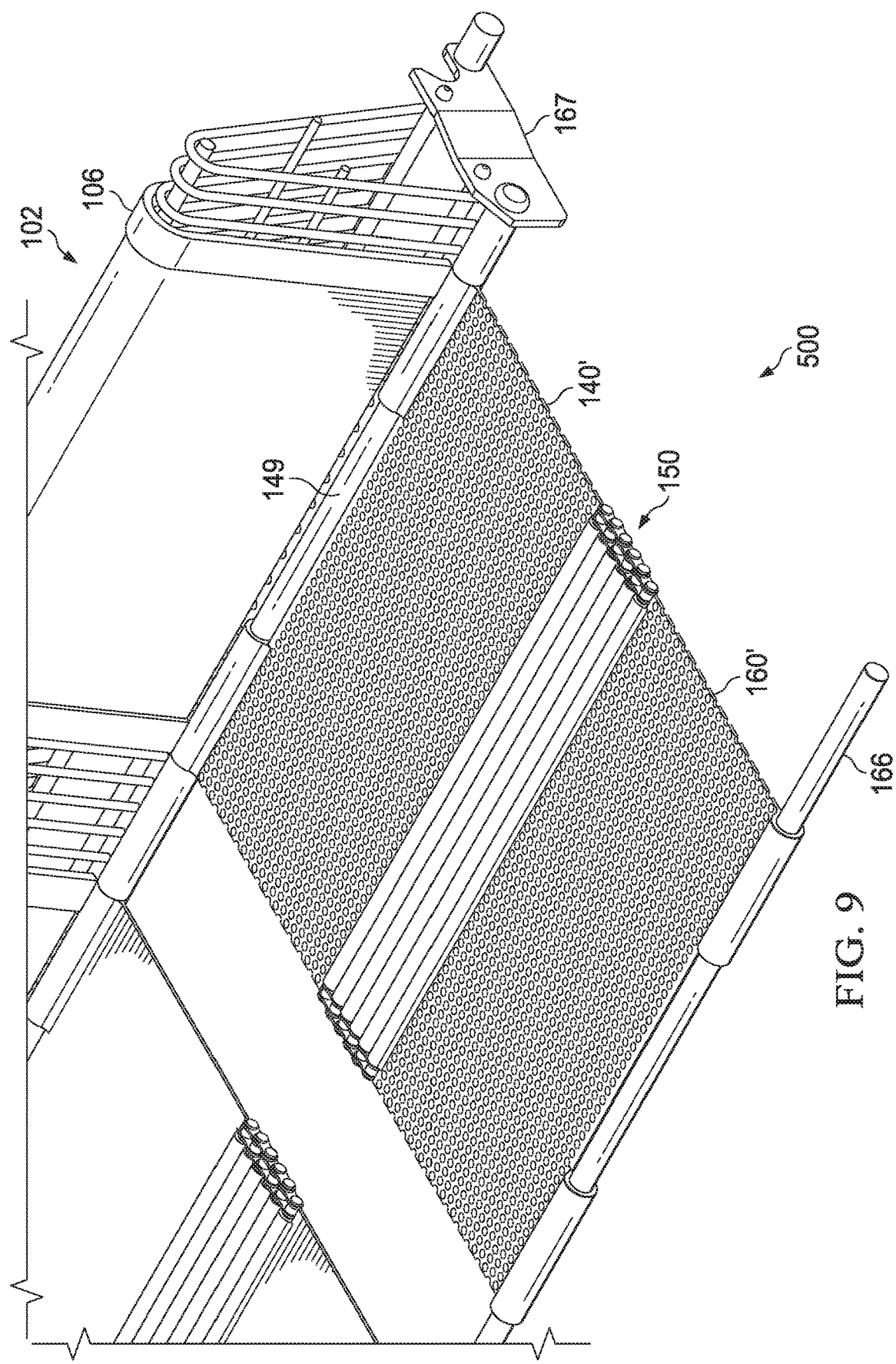
FIG. 9 is another perspective side view of the molding apparatus of FIG. 5 showing details of the structure of the carrier bars and support members.

FIG. 9 is another perspective side view of the molding apparatus 500 of FIG. 5 showing details of the structure of the carrier bars 149, 166 and support members 167.

Figure 10:
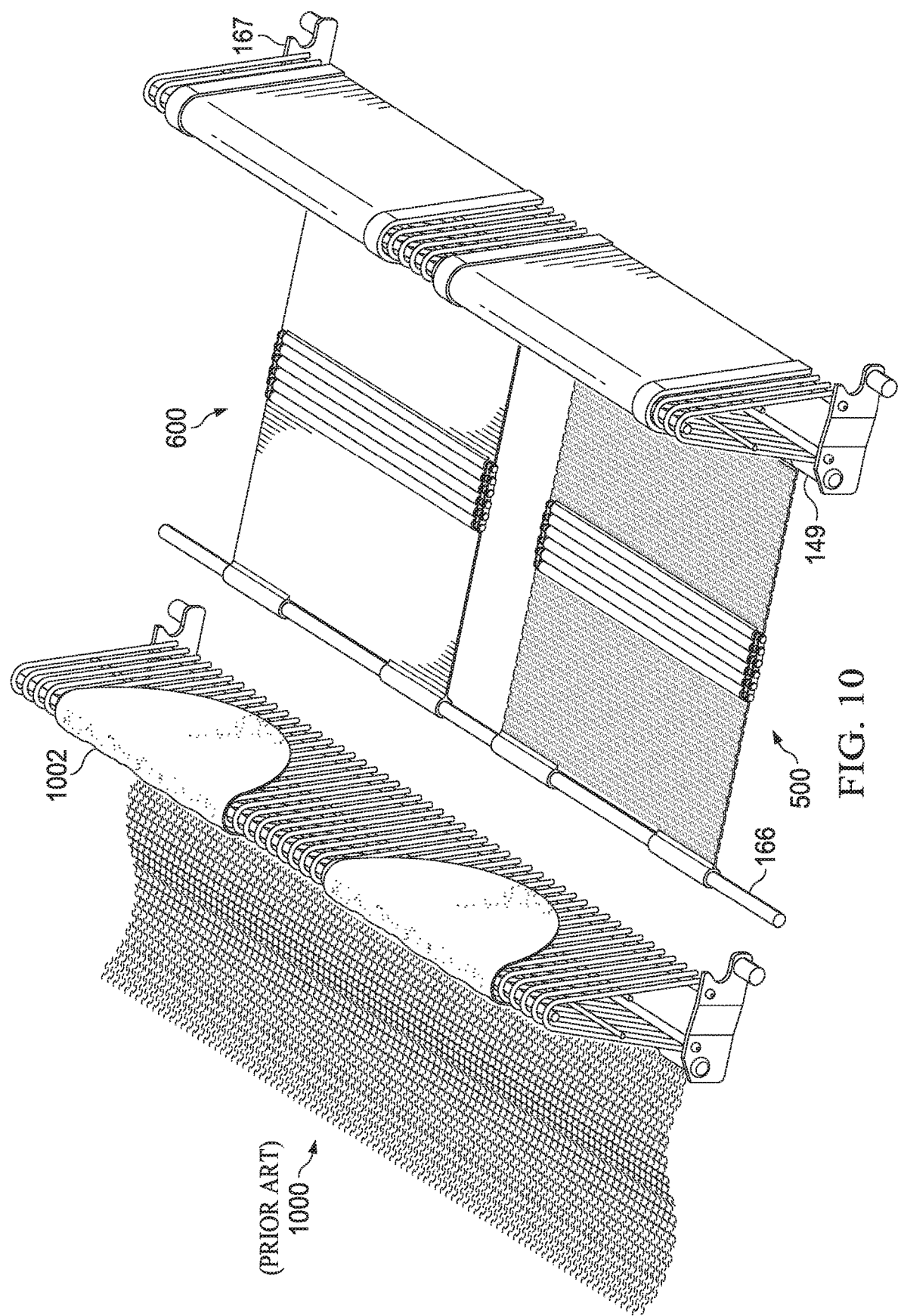
FIG. 10 is a perspective view of the taco molding apparatus of FIGS. 5 and 6 (right side of figure) next to a prior art mesh taco molding apparatus (left side of figure) and illustrating the placement of the tortillas/taco shells on the molds in the open configuration.

FIG. 10 is a perspective view of the taco molding apparatus 500 of FIG. 5 and 600 of FIG. 6 next to a prior art mesh taco molding apparatus 1000 (left side of figure) and illustrating the placement of the tortillas/taco shells 1002 on the molds in the open configuration. Note the separate apparatus 500 and 600 are mounted on a common set of carrier bars 149, 166 and support members 167.

Figure 11:
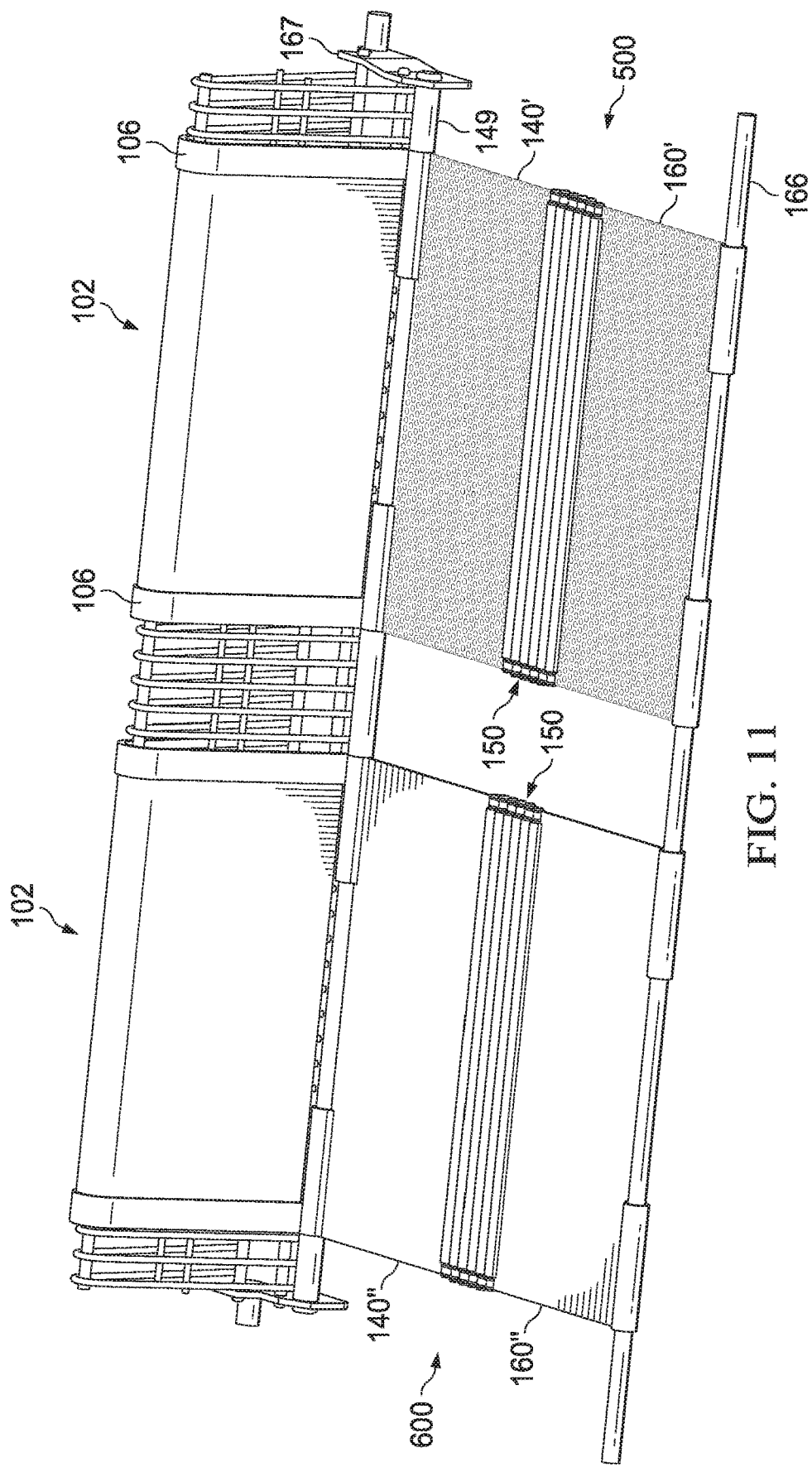
FIG. 11 is a perspective front view of the taco molding apparatus of FIGS. 5 and 6 showing the apparatus in the open configuration.

FIG. 11 is a perspective front view of the taco molding apparatus 500, 600 of FIGS. 5 and 6 showing the apparatus in the open configuration. Note the separate apparatus 500 and 600 are mounted on a common set of carrier bars 149, 166 and support members 167.

Figure 12:
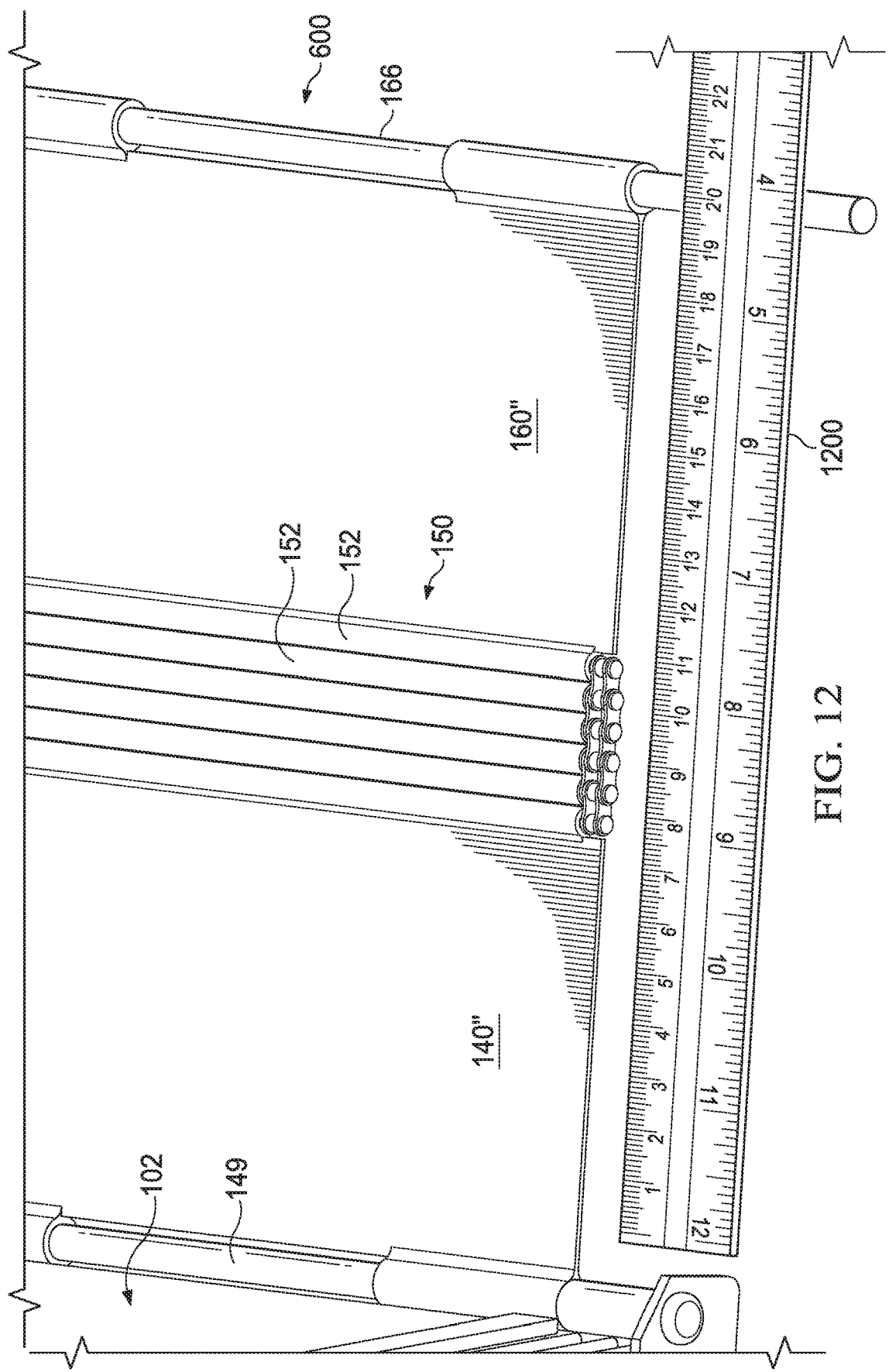
FIG. 12 is another perspective view of a molding apparatus of FIG. 6 juxtaposed with a ruler to illustrate the dimensions of this embodiment.

FIG. 12 is another perspective view of the molding apparatus 600 of FIG. 6 juxtaposed with a ruler 1200 to illustrate the dimensions of this embodiment.

Figure 13:
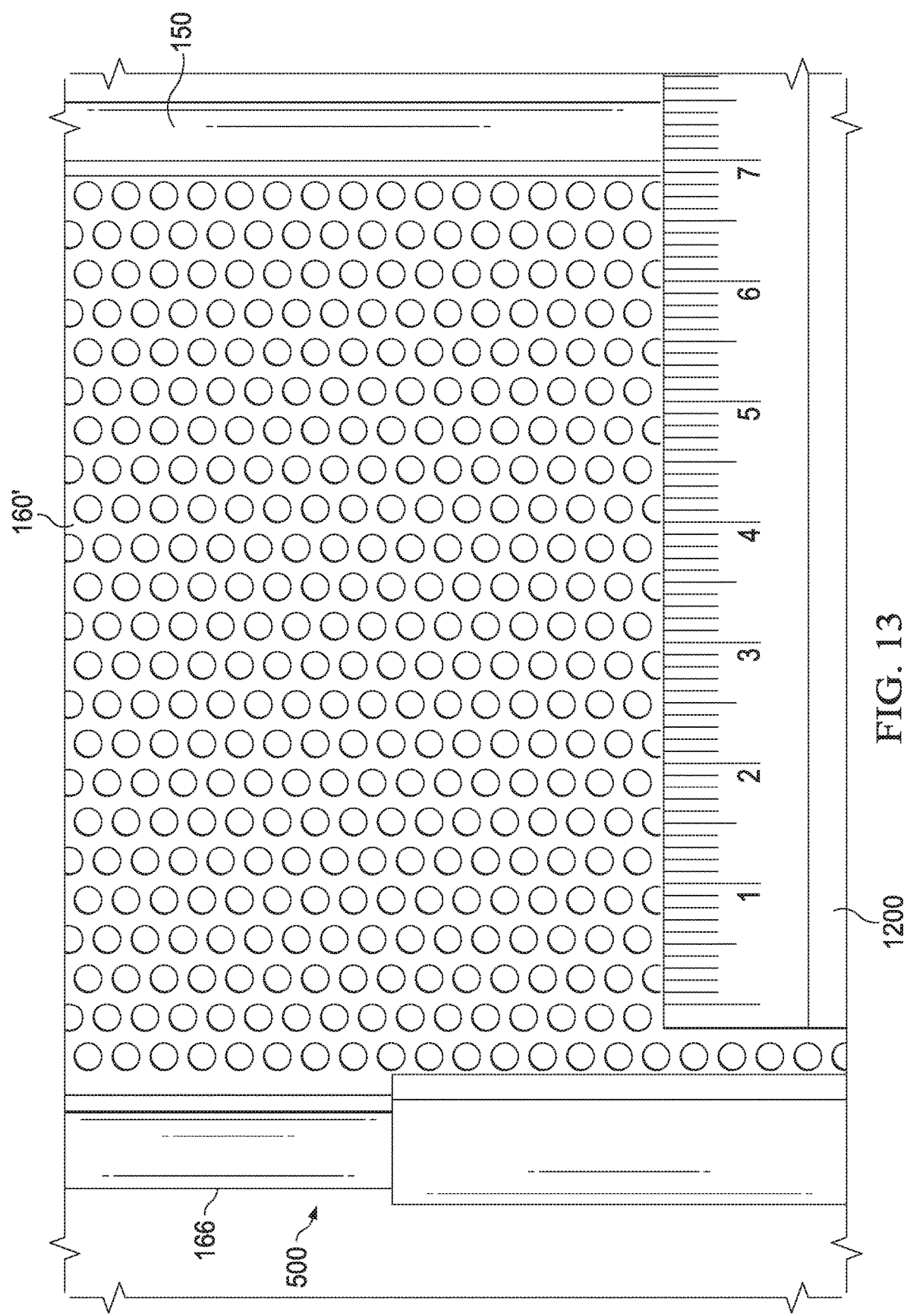
FIG. 13 is another view of the rigid perforated outer mold plate of the molding apparatus of FIG. 5 juxtaposed with a ruler to illustrate the dimensions of this embodiment.

FIG. 13 is another view of the rigid perforated outer mold plate 160' of the molding apparatus 500 of FIG. 5 juxtaposed with the ruler 1200 to illustrate the dimensions of this embodiment.

Figure 14:
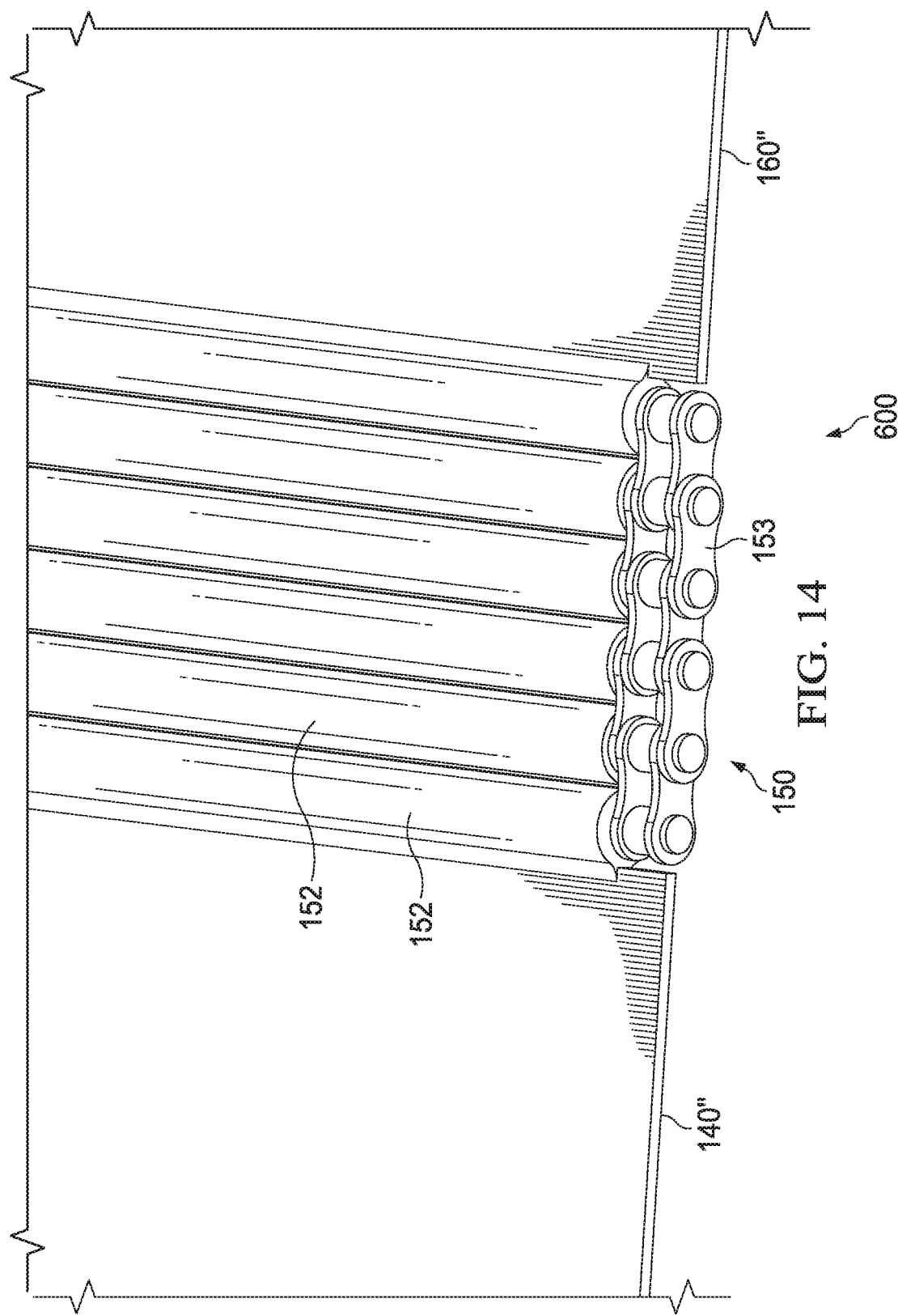
FIG. 14 is another perspective end view of the molding apparatus of FIG. 6 to illustrate the flexible connection between the rigid bar elements in this embodiment.

FIG. 14 is another perspective end view of the molding apparatus 600 of FIG. 6 to illustrate the flexible connection between the rigid bar elements 152 in this embodiment.

Figure 15:
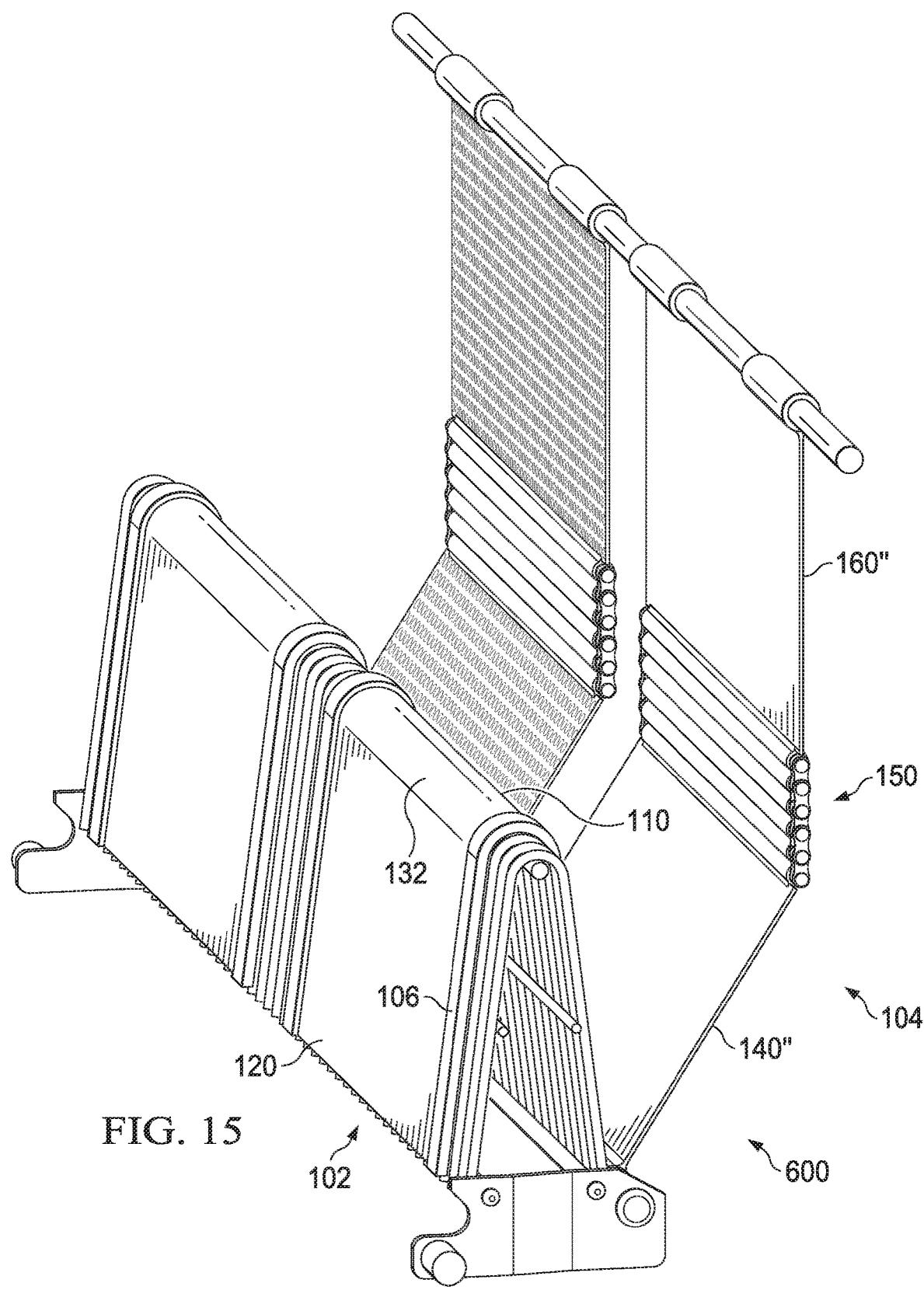
FIGS. 15-18 sequentially illustrate moving the outer mold assembly into proximity with and/or against the inner mold assembly to reconfigure the molding apparatus of FIG. 6 from the open configuration into the closed configuration, and in particular.
Figure 16:
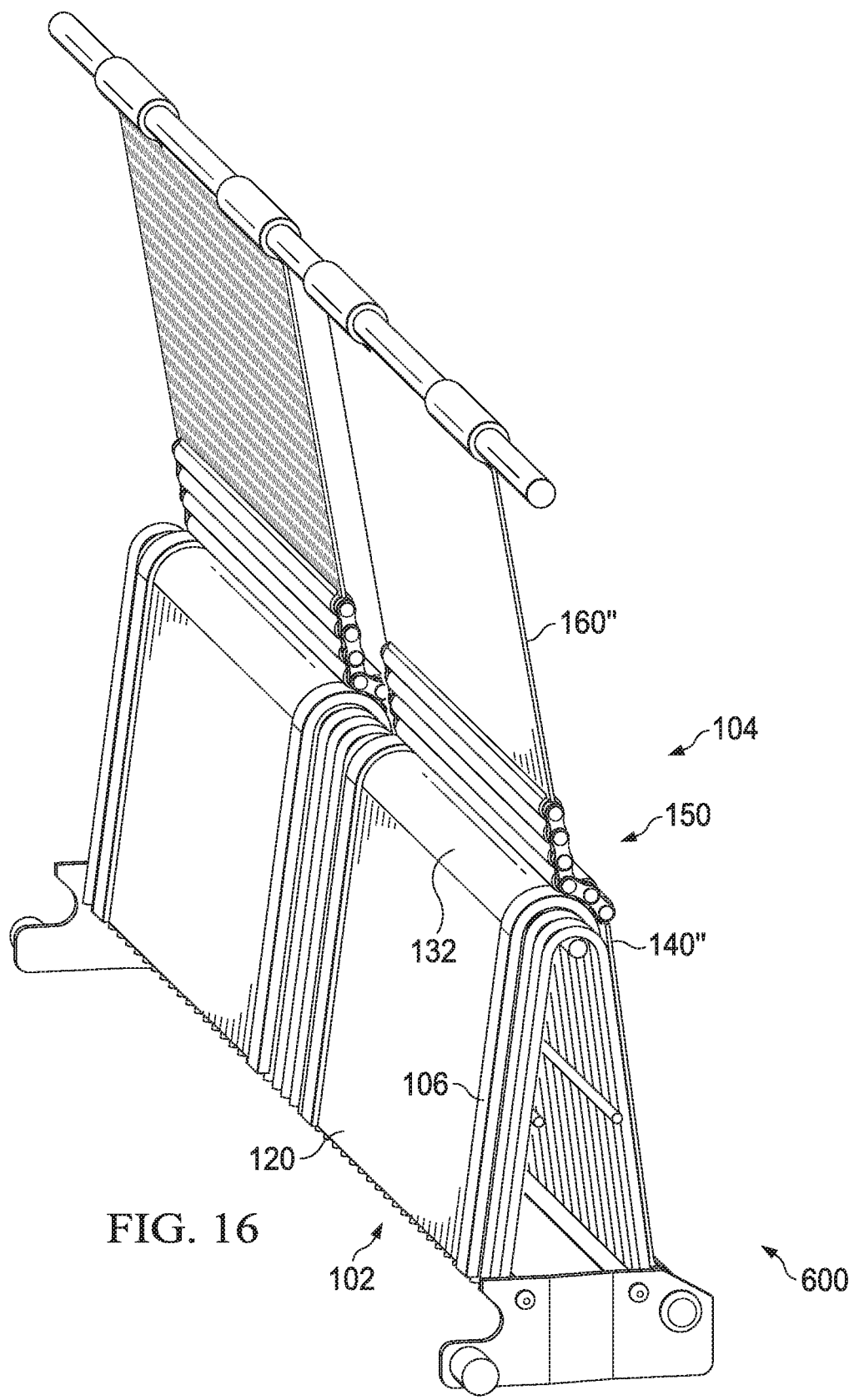
Figure 17:
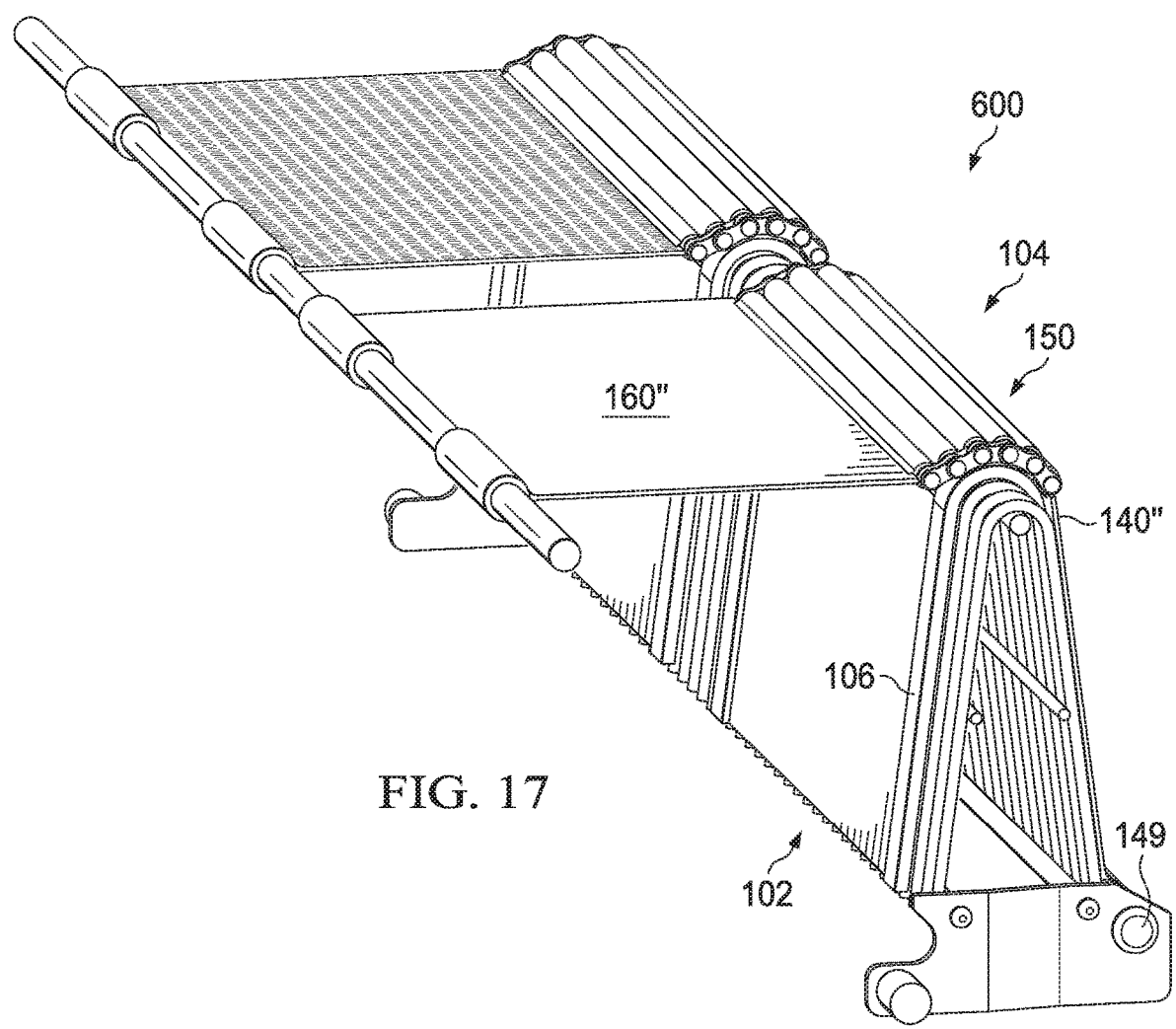
Figure 18:
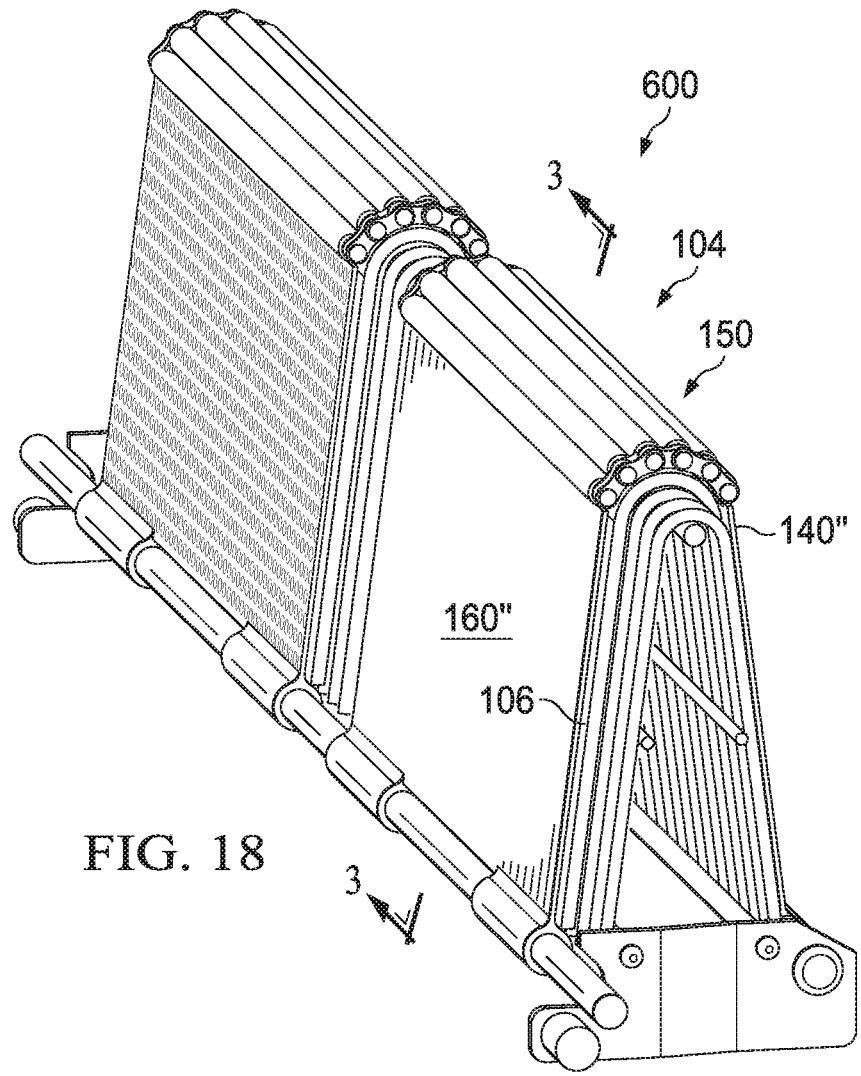

FIGS. 15-18 sequentially illustrate moving the outer mold assembly into proximity with and/or against the inner mold assembly to reconfigure the molding apparatus 600 of FIG. 6 from the open configuration into the closed configuration. In particular, FIG. 15 illustrates the outer mold assembly 104 (still in the open configuration) being moved toward the inner mold assembly 102 to transform the apparatus from the open configuration towards the closed configuration. FIG. 16 illustrates the front outer mold plate 140" closed against the front surface of the spacer member 106, thereby creating a cavity 175 (FIG. 3) of predetermined dimension between the front outer mold plate and the front inner mold section 110 (hidden from view), and with the top outer mold section 150 partially closed against the top surface of the spacer members (partially open/partially closed configuration). FIG. 17 illustrates the front outer mold plate 140" closed against the front surface of the spacer member 106, thereby creating a cavity 175 of predetermined dimension between the front outer mold plate and the front inner mold section 110, and the top outer mold section 150 closed against the top surface of the spacer members, thereby creating a cavity 176 (FIG. 3) of predetermined dimension between the top outer mold section and the top inner mold section 132, but with the rear outer mold plate 160" open (partially open/partially closed configuration). Finally, FIG. 18 illustrates the front outer mold plate 140" closed against the front outer surfaces of the spacer members 106, thereby creating a cavity 175 of predetermined dimension between the front outer mold plate and the front inner mold section 110, the top outer mold section 150 closed against the top outer surfaces of the spacer members, thereby creating a cavity 176 of predetermined dimension between the top outer mold section and the top inner mold section 132, and the rear outer mold plate 160" closed against the rear outer surface of the spacer members, thereby creating a cavity 177 (FIG. 3) of predetermined dimension between the rear outer mold plate and the rear inner mold section 120, thus completely enclosing the cavity between the outer mold assembly 104 and the inner mold assembly 102 (closed configuration).

Although the preferred embodiment has been described in detail, it should be understood that various changes, substitutions and alterations can be made therein without departing from the spirit and scope of the invention as defined by the appended claims.

What is claimed is:

1. A taco shell molding and cooking apparatus that folds tortillas into a predetermined curved configuration and submerses the folded tortillas in hot cooking fat or hot cooking oil while maintaining the predetermined curved configuration, the apparatus comprising:
   an inner mold assembly including
      a front inner mold section having a top edge, a bottom edge and a flat front surface extending therebetween, the flat front surface defining a front inner plane;
      a rear inner mold section defining a top edge, a bottom edge and a flat rear surface extending therebetween, the flat rear surface defining a rear inner plane;
      the front and rear inner mold sections being configured nonparallel to one another such that the front and rear inner plane intersect along a line defining a transverse axis; and
      a top inner mold section extending in an outwardly convex curved fashion between the top edge of the front inner mold section and the top edge of the rear inner mold section;
   an outer mold assembly including
      a front outer mold plate defining a top edge and a bottom edge and having a flat front surface extending therebetween, the bottom edge of the front outer mold plate being hingedly connected to the bottom edge of the front inner mold section along a transverse pivot axis;
      a top outer mold section comprising a sequence of transversely extending rigid rod members, the sequence beginning with a first rigid rod member and ending with a last rigid rod member;
         the first rigid rod member being attached to the top edge of the front outer mold plate and having a first rod axis extending parallel to the transverse axis;

each successive rigid rod member in the sequence including the last rigid rod member being positioned further from the top edge of the front outer mold plate than the respective previous rigid rod member, having a respective rod axis extending parallel to the transverse axis, and being hingedly connected to the respective previous rigid rod member along a respective transverse pivot axis, the rigid rods of the top outer mold section being individually rigid in the transverse direction but the sequence of rod members being collectively curvable along a curve formed perpendicular to the transverse axis;

a rear outer mold plate defining a top edge and a bottom edge and having a flat rear surface extending therebetween, the top edge of the rear outer mold plate being connected to the last rod member of the sequence of rod members;

the front outer mold plate, top outer section and rear outer mold plate being selectively movable between an open configuration wherein the outer mold assembly does not cover the inner mold assembly and a closed configuration wherein the outer mold assembly covers the outer mold assembly;

at least one spacer member having, when viewed in the transverse direction, a predetermined thickness between an inner surface and an outer surface, the spacer member being positionable between the inner mold assembly and the outer mold assembly, such that when the outer mold assembly is in the closed configuration the front inner mold section contacts the inner surface of the spacer member and the front outer mold plate contacts the outer surface of the spacer member, producing a transversely extending gap of the predetermined thickness between the front inner mold section and the front outer mold plate, the rear inner mold section contacts the inner surface of the spacer member and the rear outer mold plate contacts the outer surface of the spacer member, producing a transversely extending gap of the predetermined thickness between the rear inner mold section and the rear outer mold plate, and the curved top inner mold section contacts the inner surface of the spacer member and the curvable sequence of rod members of the top outer mold section contacts the outer surface of the spacer member, producing a transversely extending curved gap of the predetermined thickness between the top inner mold section and the top outer mold section;

whereby when the outer mold assembly is in the closed configuration a transversely extending continuous gap of the predetermined thickness is formed along the front, top and rear of the inner mold assembly.

2. The taco shell molding and cooking apparatus in accordance with claim 1, wherein the at least one spacer member has, when viewed in the transverse direction, a front portion having a front thickness $T_F$, a top portion having a top thickness $T_T$ and a rear portion having a rear thickness $T_R$, wherein the respective front thickness, top thickness, and rear thickness are measured between respective inner and outer surfaces of the spacer member.

3. The taco shell molding and cooking apparatus in accordance with claim 2, wherein the values of at least one of the front thickness $T_F$, top thickness $T_T$ and rear thickness $T_R$ is different from the values of the others.

4. The taco shell molding and cooking apparatus in accordance with claim 2, wherein the values of the front thickness $T_F$, top thickness $T_T$ and rear thickness $T_R$ are all within the range from $1/16$ inch to $3/8$ inch.

5. The taco shell molding and cooking apparatus in accordance with claim 1, wherein the at least one spacer member has, when viewed in the transverse direction, a uniform predetermined thickness between the inner surface and the outer surface.

6. The taco shell molding and cooking apparatus in accordance with claim 1, wherein the entire surfaces of the front outer mold plate and the rear outer mold plate are formed of non-perforated metal.

7. The taco shell molding and cooking apparatus in accordance with claim 1, wherein a portion of the front outer mold plate and a portion of the rear outer mold plate are formed of perforated metal.

8. The taco shell molding and cooking apparatus in accordance with claim 1, wherein the entire surfaces of the front outer mold plate and the rear outer mold plate are formed of non-perforated material.

9. The taco shell molding and cooking apparatus in accordance with claim 1, wherein a portion of the front outer mold plate and a portion of the rear outer mold plate are formed of perforated material.

10. A taco shell molding and cooking apparatus, the apparatus comprising:

an inner mold assembly having, when viewed in cross section, a front inner section, a back inner section, and a connecting inner section extending in a continuous curve between a top edge of the front inner section and a top edge of the back inner section to define a first U-shape; and an outer mold assembly having, when viewed in cross section, a front outer section, a back outer section, and a connecting outer section extending between a top edge of the front outer section and a top edge of the back outer section, a bottom edge of the front outer section being hingedly connected to a bottom edge of the front inner section, and the back outer section, the front outer section and the connecting outer section being selectively moveable relative to one another between a closed configuration and an open configuration;

wherein, when in the closed configuration, the front outer section, the back outer section, and the connecting outer section define, viewed in cross section, a second U-shape, and the front and back inner sections of the inner mold assembly are disposed between the front and back outer sections of the outer mold assembly such that the front outer section is spaced apart a first predetermined distance from the front inner section, the back outer section is spaced apart a second predetermined distance from the back inner section, and the connecting outer section is spaced apart a third predetermined distance from the connecting inner section; and wherein when in the open configuration, the front outer section is pivoted about the hinged connection away, relative to the first configuration, from the front inner section, and the front and back inner sections of the inner mold assembly are not disposed between the front and back outer sections of the outer mold assembly.

11. The taco shell molding and cooking apparatus in accordance with claim 10, wherein the connecting outer section is flexible in a machine direction but rigid in a cross-machine direction.

12. The taco shell molding and cooking apparatus in accordance with claim 11, wherein the connecting outer section comprises a juxtaposed sequence of parallel, transversely extending rigid rod members, wherein each of the rod members has respective ends and each pair of rod members are pivotally interconnected at both respective ends of the rod members.

13. The taco shell molding and cooking apparatus in accordance with claim 10, wherein the entire surfaces of the front outer section and the back outer section are formed of non-perforated metal.

14. The taco shell molding and cooking apparatus in accordance with claim 10, wherein a portion of the front outer section and a portion of the back outer section are formed of perforated metal.

15. The taco shell molding and cooking apparatus in accordance with claim 10, wherein a value of at least one of the first predetermined distance, the second predetermined distance and the third predetermined distance is different from the values of the others.

16. The taco shell molding and cooking apparatus in accordance with claim 10, wherein the entire surfaces of the front outer section and the back outer section are formed of non-perforated material.

17. The taco shell molding and cooking apparatus in accordance with claim 10, wherein a portion of the front outer section and a portion of the back outer section are formed of perforated material.

* * * * *